United States Patent
Choi et al.

(10) Patent No.: US 7,926,383 B2
(45) Date of Patent: Apr. 19, 2011

(54) APPARATUS FOR PREVENTING BRAKE PEDAL OF VEHICLE FROM BEING PUSHED REARWARD

(75) Inventors: Jin-Oh Choi, Gyeongsangbuk-do (KR); Seok Kang, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 729 days.

(21) Appl. No.: 11/642,339

(22) Filed: Dec. 20, 2006

(65) Prior Publication Data

US 2007/0227289 A1 Oct. 4, 2007

(30) Foreign Application Priority Data

Dec. 29, 2005 (KR) .................. 10-2005-0133868

(51) Int. Cl.
*G05G 1/30* (2008.04)
(52) U.S. Cl. ........................................................ 74/512
(58) Field of Classification Search ............... 74/512, 74/513, 560; 180/274; 280/748, 784
See application file for complete search history.

(56) References Cited

U.S. PATENT DOCUMENTS

| | | | |
|---|---|---|---|
| 5,848,662 | A | 12/1998 | Sakaue |
| 6,142,036 | A | 11/2000 | Mizuma et al. |
| 6,176,340 | B1 * | 1/2001 | Mizuma et al. ............... 180/274 |
| 6,418,812 | B2 * | 7/2002 | Mizuma et al. ................. 74/512 |
| 6,655,489 | B2 * | 12/2003 | Kawai et al. ................... 180/274 |
| 2003/0019319 | A1 | 1/2003 | Mizuma |
| 2003/0019320 | A1 * | 1/2003 | Thistleton et al. ............... 74/560 |
| 2004/0020324 | A1 | 2/2004 | Jemmeson et al. |
| 2005/0045406 | A1 * | 3/2005 | Miyoshi ........................ 180/274 |
| 2005/0050980 | A1 | 3/2005 | Park |
| 2005/0103151 | A1 * | 5/2005 | Yoon ................................ 74/512 |
| 2006/0162481 | A1 * | 7/2006 | Sato ................................ 74/512 |
| 2007/0000708 | A1 * | 1/2007 | Himetani ....................... 180/271 |

FOREIGN PATENT DOCUMENTS

| | | |
|---|---|---|
| DE | 602004003619 T2 | 10/2007 |
| DE | 602004004218 T2 | 1/2008 |
| EP | 1479578 B1 | 11/2004 |
| EP | 1512586 B1 | 1/2007 |
| FR | 2843569 | 2/2004 |
| JP | 56-163973 | 12/1981 |
| JP | 2000-185632 | 4/2000 |
| JP | 2001-171495 | 6/2001 |
| JP | 2003-252186 | 9/2003 |
| JP | 2005-138613 | 2/2005 |
| WO | WO 2004/089710 A1 | 10/2004 |

OTHER PUBLICATIONS

Office Action for related German Patent Application No. 102007032515.2 (7 pages).

* cited by examiner

*Primary Examiner* — Vicky A Johnson
(74) *Attorney, Agent, or Firm* — Edwards Angell Palmer & Dodge LLP; Kongsik Kim

(57) ABSTRACT

An apparatus for preventing the brake pedal of a vehicle from being pushed rearward when an impact is externally applied to the brake pedal is provided. The apparatus includes a first bracket fastened to a cowl, a second bracket coupled to the first bracket and a master vac positioned beyond a dash panel, a brake pedal arm connected to a pushrod which is connected to the master vac, and rotatably installed on the second bracket, and push-prevention means hingedly coupled to the second bracket for rotating the brake pedal arm in a predetermined direction.

9 Claims, 19 Drawing Sheets

APPARATUS FOR PREVENTING BRAKE PEDAL OF VEHICLE FROM BEING PUSHED REARWARD

CROSS-REFERENCE TO RELATED APPLICATION

This application is based on and claims priority from Korean Patent Application No. 10-2005-133868 filed on Dec. 29, 2005, in the Korean Intellectual Property Office, the disclosure of which is incorporated herein in its entirety by reference.

BACKGROUND OF THE INVENTION

1. Field of the Invention

The present invention relates to an apparatus for preventing the brake pedal of a vehicle from being pushed rearward, and more particularly to an apparatus for preventing a brake pedal from being pushed rearward when an impact is externally applied to the brake pedal.

2. Description of the Prior Art

In general, when a driver steps on a brake pedal, the brake pedal pushes a pushrod which is connected to a master vac positioned beyond a dash panel, by which a hydraulic pressure is generated in a master cylinder.

When a collision occurs, it is normal for a driver to forcefully step on a brake pedal so as to quickly decrease the speed of the vehicle. At this time, since an impact force produced due to the collision, for example, a head-on collision, is applied to the driver's foot which is pressing on the brake pedal, the driver's foot as well as legs are likely to be seriously injured.

In addition, when a serious collision occurs, the dash panel is pushed toward the passenger compartment of a vehicle and the impact force is doubled, and since the brake pedal is positioned adjacent to the driver's foot, the degree to which the foot and the lower legs of the driver are injured is further increased.

In order to prevent the foot and the lower leg from being injured by the brake pedal when a collision occurs, an apparatus is disclosed in which a brake pedal is released from a mounted position or is bent by itself when a strong impact force is applied such as during a collision.

However, this type of apparatus has a serious safety-related defect in that because the structural strength of the brake pedal is weakened, the brake pedal can be released from the mounted position or bent under a normal driving condition.

Also, the conventional apparatuses for preventing a brake pedal from being pushed have problems in that the structures and assembly are complicated, and the manufacturing cost is high.

SUMMARY OF THE INVENTION

Accordingly, the present invention has been made to solve the above-mentioned problems occurring in the prior art, and an object of the present invention is to provide an apparatus which has a simple construction and prevents a brake pedal arm from being pushed rearward when a head-on collision occurs.

Further to the above object, the present invention has additional technical objects not described above, which can be clearly understood by those skilled in the art from the following description.

According to an aspect of the present invention, there is provided an apparatus for preventing a brake pedal of a vehicle from being pushed rearward, the apparatus including a first bracket fastened to a cowl; a second bracket coupled to the first bracket and a master vac positioned beyond a dash panel; a brake pedal arm connected to a pushrod which is connected to the master vac, and rotatably installed on the second bracket; and push-prevention means hingedly coupled to the second bracket for rotating the brake pedal arm in a predetermined direction.

BRIEF DESCRIPTION OF THE DRAWINGS

The above and other objects, features and advantages of the present invention will become apparent from the following detailed description taken in conjunction with the accompanying drawings, in which.

DETAILED DESCRIPTION OF THE PREFERRED EMBODIMENTS

Figure 1:
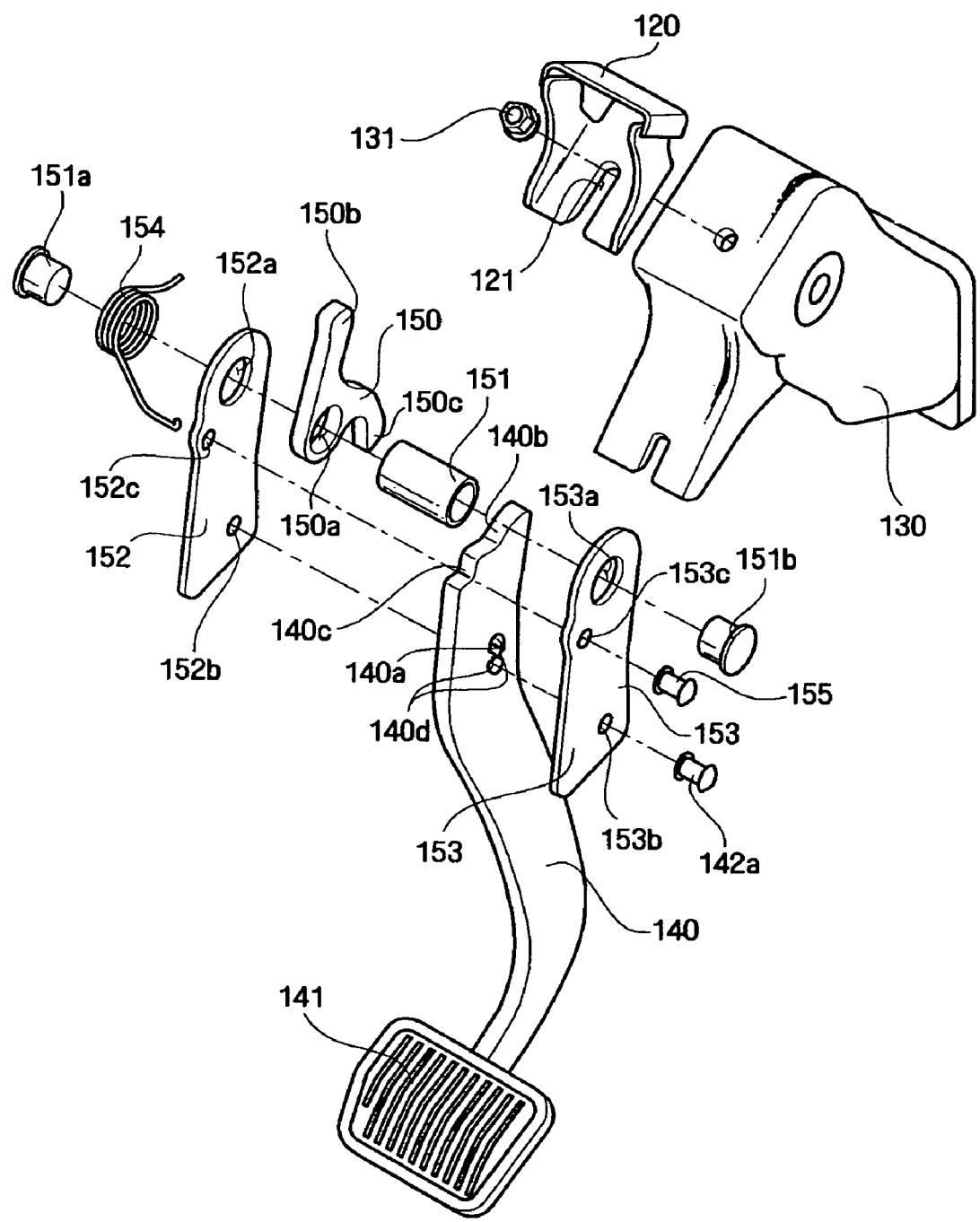
FIG. 1 is an exploded perspective view illustrating an apparatus for preventing the brake pedal of a vehicle from being pushed rearward in accordance with a first embodiment of the present invention.

Hereinafter, preferred embodiments of the present invention will be described with reference to the accompanying drawings. However, it should be understood that the present invention is not limited to the illustrated embodiments and can be realized in various shapes and patterns. The illustrated embodiments are provided to properly disclose of the present invention and to appropriately inform a person skilled in the art of the scope of the present invention which is defined only by the attached claims. In the following description, the same reference numerals will be used throughout the drawings and the description to refer to the same or similar parts.

Figure 2:
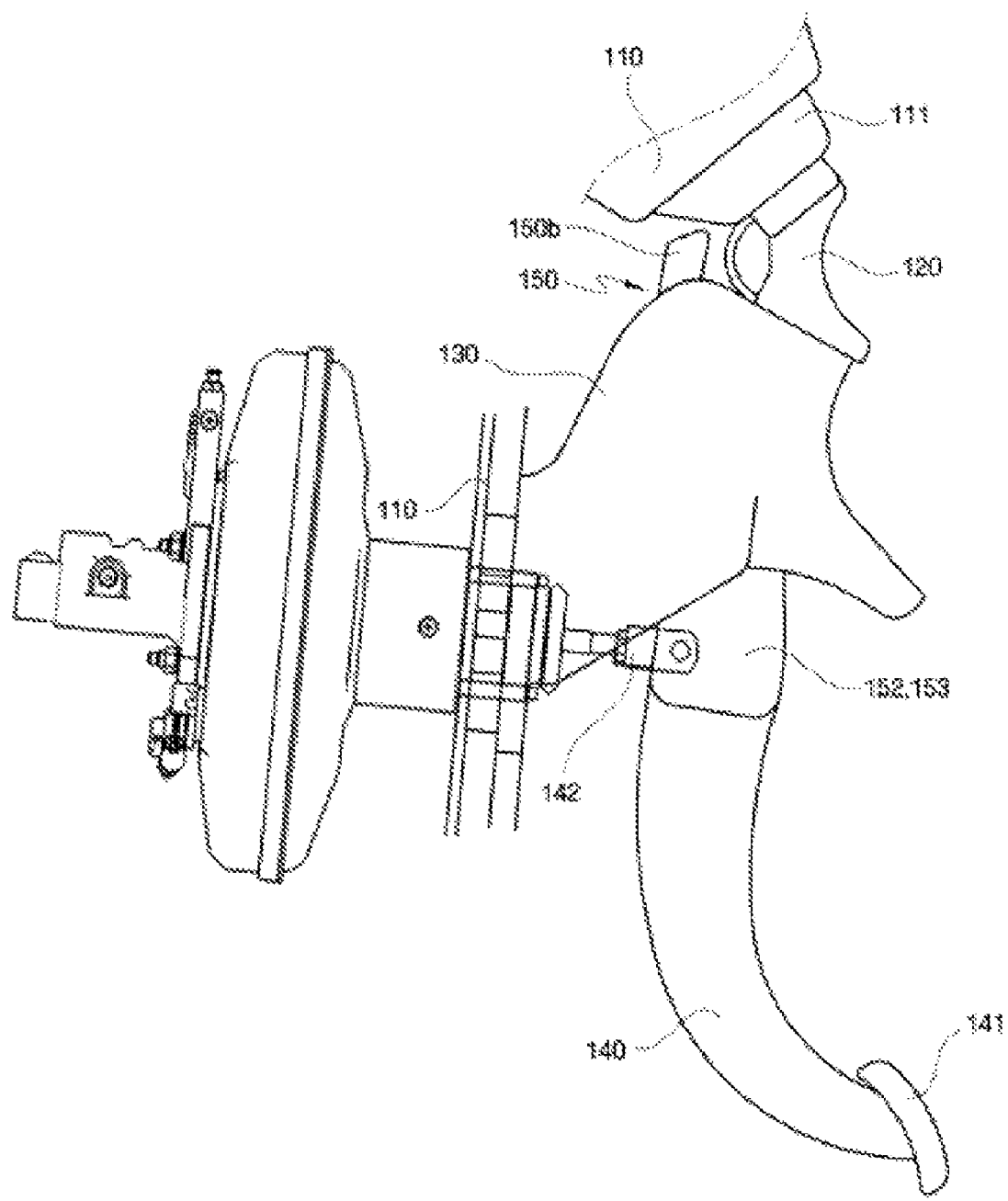
FIG. 2 is a side view illustrating the apparatus for preventing the brake pedal of a vehicle from being pushed rearward in accordance with the first embodiment of the present invention.

FIG. 1 is an exploded perspective view illustrating an apparatus for preventing the brake pedal of a vehicle from being pushed rearward in accordance with a first embodiment of the present invention, and FIG. 2 is a side view of the same.

Referring to FIGS. 1 and 2, the apparatus for preventing the brake pedal of a vehicle from being pushed rearward in accordance with the first embodiment of the present invention includes a first bracket 120 fastened to a cowl 111 which is installed on a dash panel 110, a second bracket 130 coupled to the first bracket 120 and connected to the master vac (not shown) which is positioned beyond the dash panel 110, a brake pedal arm 140 having a brake pedal 141 which is formed on the distal end thereof and connected to a pushrod 142 which is fastened to the master vac, and a push-prevention means 150 rotatably coupled to the second bracket 130 through a pipe hinge 151 to rotate the second bracket 130 and the brake pedal arm 140 in a predetermined direction through the rotation of the push-prevention means 150.

The second bracket 130 is coupled to the first bracket 120 by a flange bolt 131 which is inserted through the first insertion groove 121 defined in the first bracket 120. When a head-on collision occurs, the flange bolt 131 is released from the first insertion groove 121 by an impact force transmitted through the dash panel 110, and the second bracket 130 is decoupled from the first bracket 120. The coupling surfaces of the first and second brackets 120 and 130 are inclined downward in the direction in which the impact force is transmitted. Therefore, when an impact force is transmitted from the front part of a vehicle, in conformity with the inclination angle of the first and second brackets 120 and 130, the second bracket 130 is rotated in a predetermined direction and is decoupled from the first bracket 120.

First and second support brackets 152 and 153 are respectively positioned on both sides of the brake pedal arm 140, and are hingedly coupled to the brake pedal arm 140 through the pipe hinge 151. The first and second support brackets 152 and 153 are respectively defined with first and second coupling holes 152a and 153a through which the hinge pipe 151 passes. Release prevention members 151a and 151b for preventing the release of the pipe hinge 151 are coupled to both ends of the pipe hinge 151.

A return spring 154 is disposed on a side of the first support bracket 152. After a driver steps on the brake pedal 141 and the brake pedal arm 140 is rotated in a direction, if the driver removes the force applied to the brake pedal 141, the return spring 154 returns the brake pedal arm 140 to its original position The first and second support brackets 152 and 153 are defined with third and fourth coupling holes 152b and 153b through which a coupling pin 142a passes. The coupling pin 142a also passes through a seventh coupling hole 140a which is defined in the brake pedal arm 140, to couple the brake pedal arm 140 to the pushrod 142. Second and third insertion grooves 140b and 140c are defined on the upper end of the brake pedal arm 140. The first and second support brackets 152 and 153 are also defined with fifth and sixth coupling holes 152c and 153c through which a support pin 155 to be fitted into the third insertion groove 140c to support the brake pedal arm 140 passes. The push-prevention means 150 is fitted into the second insertion groove 140b to support the brake pedal arm 140.

Figure 3:
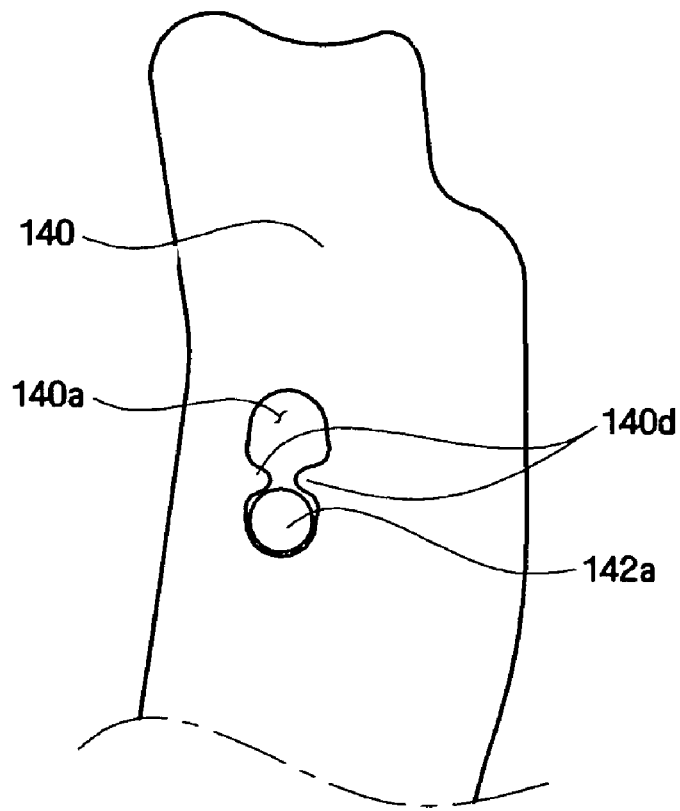
FIG. 3 is a schematic view illustrating a seventh coupling hole and movement restraining protrusions in accordance with the first embodiment of the present invention.

The seventh coupling hole 140a is defined to be elongated in the lengthwise direction of the brake pedal arm 140. Both ends of the seventh coupling hole 140a, which is viewed from the lengthwise direction thereof, have different diameters. Referring to FIG. 3, movement-restraining projections 140d for restraining the movement of the brake pedal arm 140 are formed on the inner edge of the brake pedal arm 140 which defines the seventh coupling hole 140a. The movement-restraining projections 140d are formed of a soft material which can be easily broken to allow the brake pedal arm 140 to be moved downward when an impact force is externally applied. For example, in the case where a head-on collision occurs, due to the fact that the second bracket 130 is inclinedly coupled to the first bracket 120, the second bracket 130 is decoupled from the first bracket 120, and the brake pedal arm 140 moves downward. When the brake pedal arm 140 moves downward, the coupling pin 142a breaks the movement-restraining projections 140d to allow the brake pedal arm 140 to move downward.

The push-prevention means 150 is defined with a first through-hole 150a through which the pipe hinge 151 passes, and has first and second arms 150b and 150c which are formed to extend in different directions when viewed from the first through-hole 150a. Due to this fact, the push-prevention means 150 is hingedly coupled to the first and second support brackets 152 and 153 through the pipe hinge 151.

Figure 4:
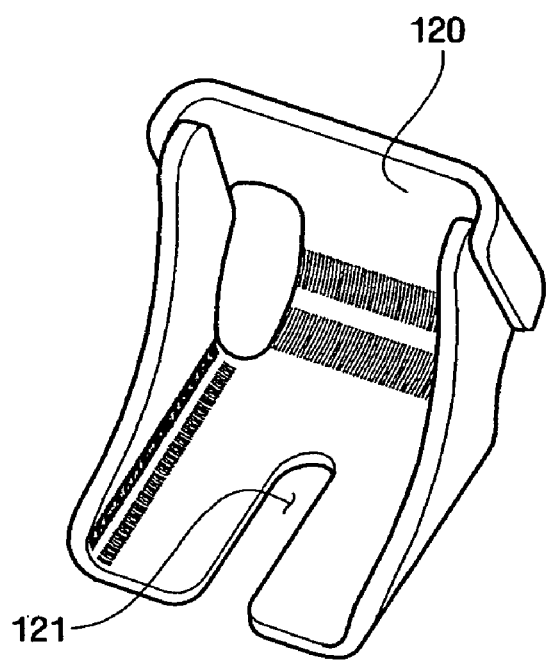
FIG. 4 is a perspective view illustrating a first bracket in accordance with the first embodiment of the present invention.
Figure 5:
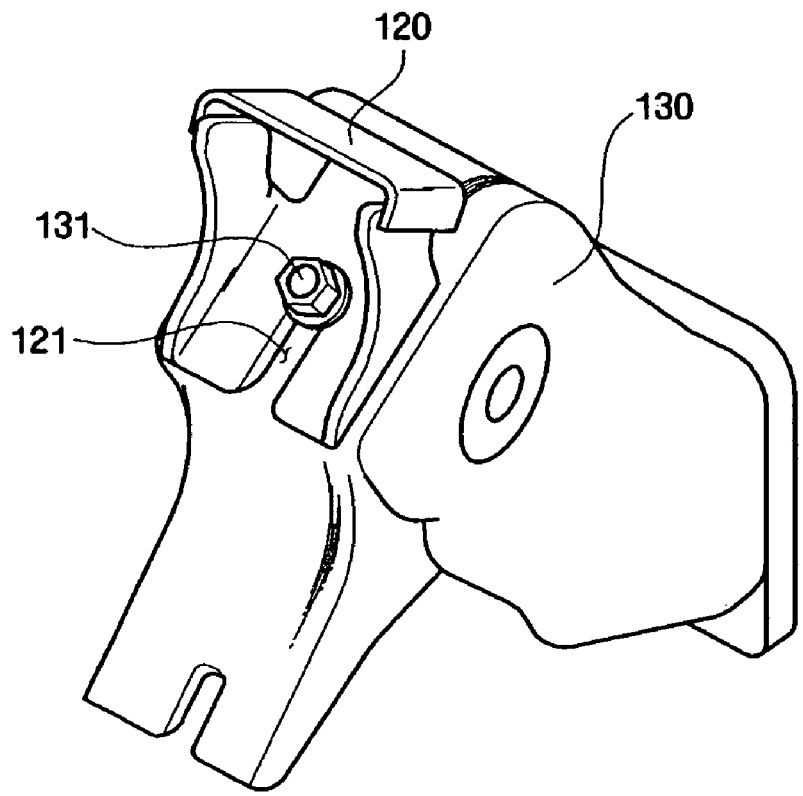
FIG. 5 is a perspective view illustrating a second bracket assembled with the first bracket in accordance with the first embodiment of the present invention.

FIG. 4 is a perspective view illustrating the first bracket in accordance with the first embodiment of the present invention, and FIG. 5 is a perspective view illustrating the second bracket assembled with the first bracket in accordance with the first embodiment of the present invention.

Referring to FIGS. 4 and 5, due to the fact that the first bracket 120 is defined with the first insertion groove 121, the second bracket 130 is coupled to the first bracket 120 by the flange bolt 131 which is inserted through the first insertion groove 121. In the flange bolt 131, one end which is coupled to the second bracket 130 has a smaller diameter than the other end. Therefore, when the flange bolt 131 is inserted through the first insertion groove 121, since the other end of the flange bolt 131 has a larger diameter, the second bracket 130 is prevented from being unintentionally decoupled from the first bracket 120.

Figure 6:
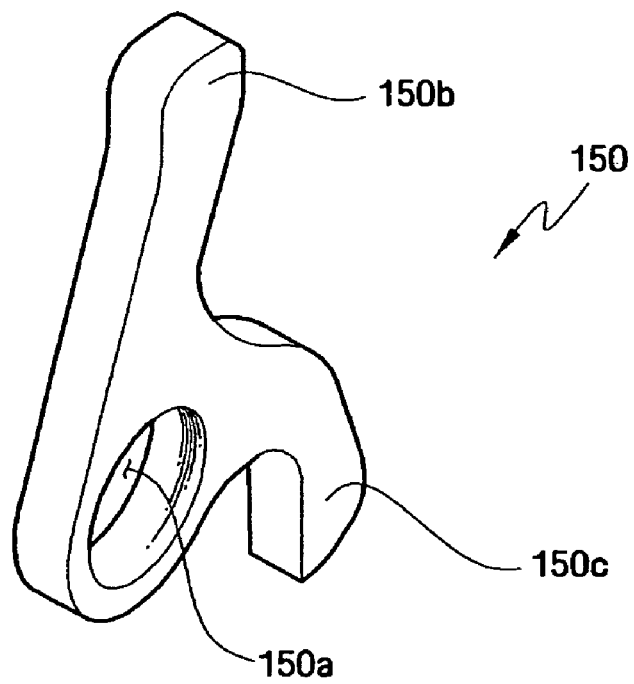
FIG. 6 is a perspective view illustrating a push-prevention means in accordance with the first embodiment of the present invention.

FIG. 6 is a perspective view illustrating the push-prevention means in accordance with the first embodiment of the present invention.

Referring to FIG. 6, the push-prevention means 150 in accordance with the first embodiment of the present invention includes the first through-hole 150a through which the pipe hinge 151 passes, and the first and second arms 150b and 150c which are formed to extend in different directions when viewed from the first through-hole 150a. The first embodiment of the present invention will be described on the assumption that the first arm 150b is positioned to face the first bracket 120 and the second arm 150c is positioned to face the brake pedal arm 140. The first and second arms 150b and 150c are formed to have lengths which are greater than the length between the first through-hole 150a and the first bracket 120 and the length between the first through-hole 150a and the brake pedal arm 140, respectively.

When an impact force is transmitted from the dash panel 110 to the push-prevention means 150, the first arm 150b collides against the first bracket 120, and as a result, the push-prevention means 150 is rotated in a direction opposite to the direction in which the impact force is transmitted. Due to the rotation of the push-prevention means 150, the second arm 150c collides against a side of the brake pedal arm 140 and prevents the brake pedal arm 140 from being pushed rearward.

Concretely speaking, if a head-on collision occurs, as the dash panel 110 is pushed toward the inside of the vehicle by the impact force applied to the vehicle body, the impact force is transmitted to the brake pedal arm 140 via the second bracket 130 and the pushrod 142.

At this time, the flange bolt 131 which is inserted through the first insertion groove 121 of the first bracket 120 is released from the first insertion groove 121, and the second bracket 130 is rotated with respect to the first bracket 120 due to the inclined coupling between the first and second brackets 120 and 130 and is decoupled from the first bracket 120. The push-prevention means 150 which is hingedly coupled to the second bracket 130 is also pushed rearward by the impact force transmitted to the second bracket 130, and the first arm 150b collides on the first bracket 120. At this time, as the second bracket 130 is decoupled from the first bracket 120 while being rotated in the predetermined direction, the movement-restraining projections 140d are broken by the coupling pin 142a, and the brake pedal arm 140 is moved downward. The support pin 155 is also released from the third insertion groove 140c, and the brake pedal arm 140 is ready to be rotated. Then, as the second arm 150c collides against the brake pedal arm 140 due to the rotation of the push-prevention means 150, the brake pedal arm 140 is rotated and prevented from being pushed inward.

Figure 7:
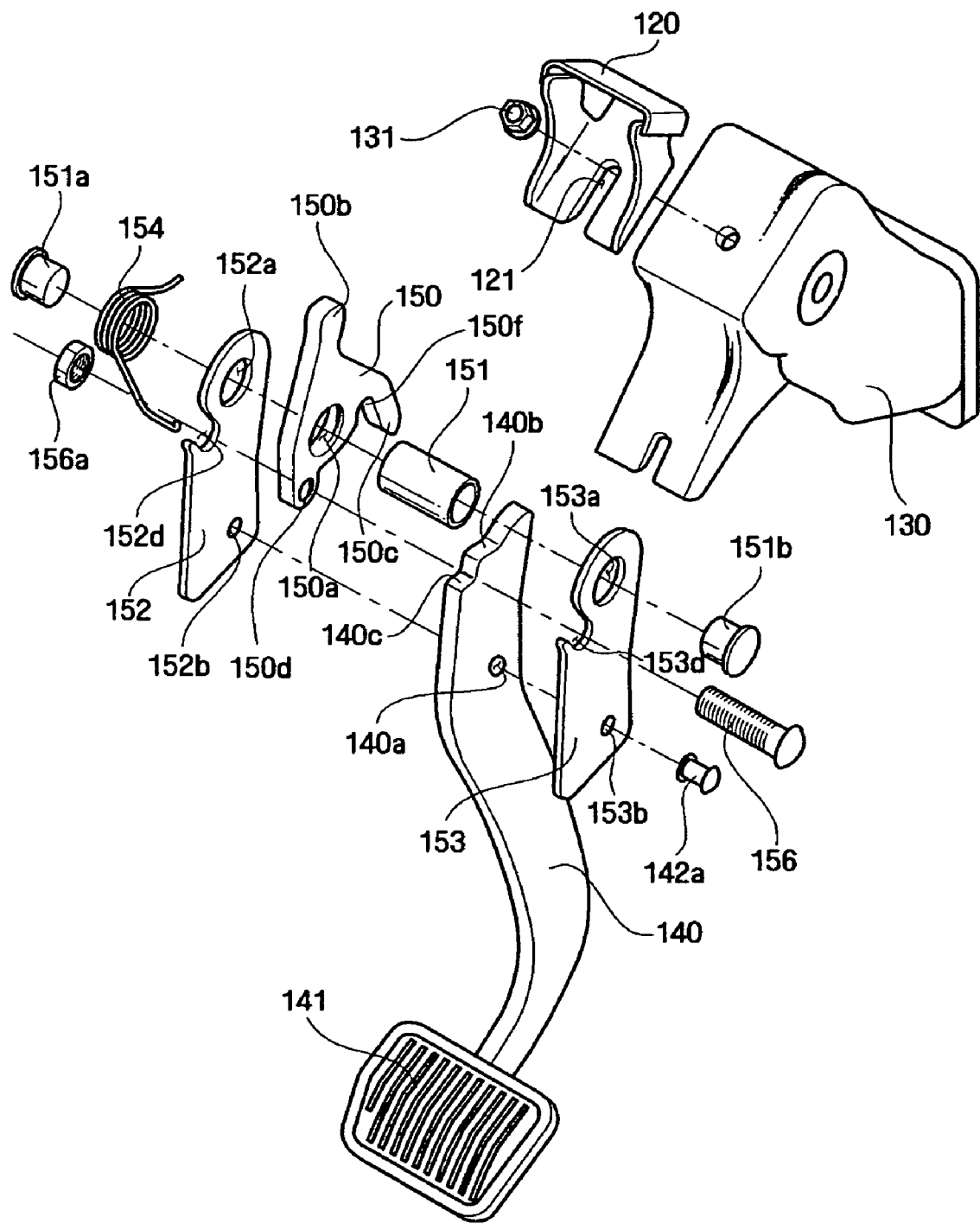
FIG. 7 is an exploded perspective view illustrating an apparatus for preventing the brake pedal of a vehicle from being pushed rearward in accordance with a second embodiment of the present invention.
Figure 8:
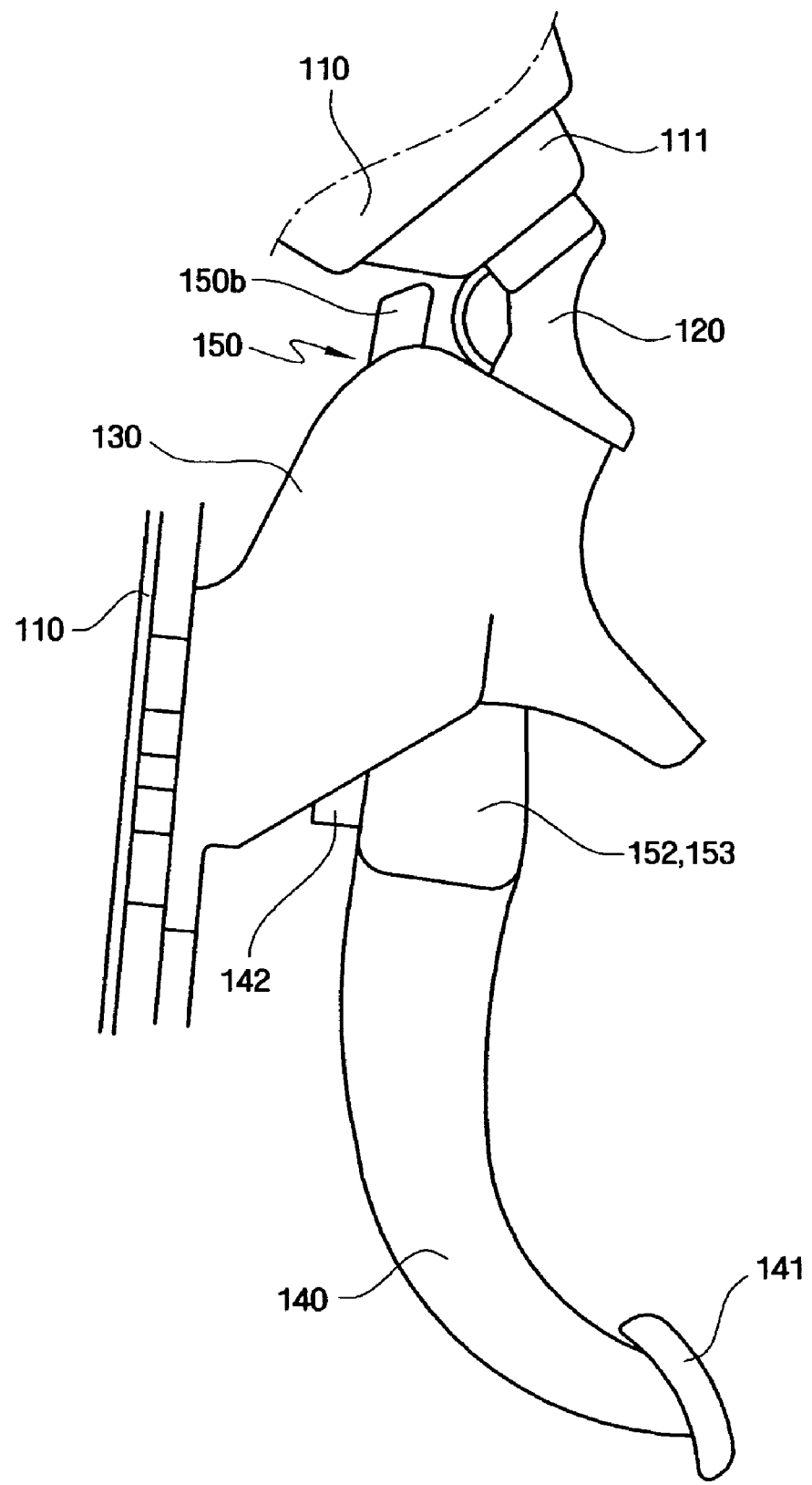
FIG. 8 is a side view illustrating the apparatus for preventing the brake pedal of a vehicle from being pushed rearward in accordance with the second embodiment of the present invention.

FIG. 7 is an exploded perspective view illustrating an apparatus for preventing the brake pedal of a vehicle from being pushed rearward in accordance with a second embodiment of the present invention, and FIG. 8 is a side view illustrating the apparatus for preventing the brake pedal of a vehicle from being pushed rearward in accordance with the second embodiment of the present invention.

Referring to FIGS. 7 and 8, the apparatus for preventing the brake pedal of a vehicle from being pushed rearward in accordance with the second embodiment of the present invention includes a first bracket 120 fastened to a cowl 111 which is installed on a dash panel 110, a second bracket 130 coupled to the first bracket 120 and connected to the master vac (not shown) which is positioned beyond the dash panel 110, a brake pedal arm 140 having a brake pedal 141 which is formed on the distal end thereof and connected to a pushrod 142 which is fastened to the master vac, and push-prevention means 150 rotatably coupled to the second bracket 130 through a pipe hinge 151 to rotate the brake pedal arm 140 in a predetermined direction through the rotation of the push-prevention means 150.

The second bracket 130 is coupled to the first bracket 120 by a flange bolt 131 which is inserted through the first insertion groove 121 defined in the first bracket 120. When a head-on collision occurs, the flange bolt 131 is released from the first insertion groove 121 by an impact force transmitted through the dash panel 110, and the second bracket 130 is decoupled from the first bracket 120. The coupling surfaces of the first and second brackets 120 and 130 are inclined downward in a direction in which the impact force is transmitted. Therefore, when an impact force is transmitted from the front part of a vehicle, the second bracket 130 is rotated in a predetermined direction and is decoupled from the first bracket 120.

First and second support brackets 152 and 153 are respectively positioned on both sides of the brake pedal arm 140 and are hingedly coupled to the brake pedal arm 140 through the pipe hinge 151. The first and second support brackets 152 and 153 are respectively defined with first and second coupling holes 152a and 153a through which the hinge pipe 151 passes. Release prevention members 151a and 151b for preventing the release of the pipe hinge 151 are coupled to both ends of the pipe hinge 151 which has passed through the first and second coupling holes 152a and 153a.

A return spring 154 is disposed on a side of the first support bracket 152. After a driver steps on the brake pedal 141 and the brake pedal arm 140 is rotated in a direction, if the driver removes the force applied to the brake pedal 141, the return spring 154 returns the brake pedal arm 140 to an original position thereof.

The first and second support brackets 152 and 153 are defined with third and fourth coupling holes 152b and 153b through which a coupling pin 142a passes. The coupling pin 142a also passes through a seventh coupling hole 140a which is defined in the brake pedal arm 140, to couple the brake pedal arm 140 to the pushrod 142.

Second and third insertion grooves 140b and 140c are defined on the upper end of the brake pedal arm 140. The pipe hinge 151 passes through the second insertion groove 140b, and a fastening pin 156, which is installed through the first bracket 120, the push-prevention means 150 and the second bracket 130, passes through the third insertion groove 140c.

The push-prevention means 150 includes a first through-hole 150a through which the pipe hinge 151 passes, first and second arms 150b and 150c which are formed to extend in different directions when viewed from the first through-hole 150a, and a second through-hole 150d through which the fastening pin 156 to pass through the first and second fastening grooves 152d and 153d defined in the first and second support brackets 152 and 13 passes.

A thread is formed on one part of the fastening pin 156. After the fastening pin 156 passes through the second through-hole 150d and both ends of the fastening pin 156 are fitted into the first and second fastening grooves 152d and 153d, a nut 156a is coupled to the thread of the fastening pin 156, by which the position of the fastening pin 156 is fixed. In normal times during which the vehicle travels, both ends of the fastening pin 156 are respectively fitted into the first and second fastening grooves 152d and 153d to fixedly maintain the push-prevention means 150, and the middle portion of the fastening pin 156 is fitted into the third insertion groove 140c of the brake pedal arm 140 to support the brake pedal arm 140. When a head-on collision occurs, the fastening pin 156 is released from the first and second fastening grooves 152d and 153d.

When the head-on collision occurs, as the fastening pin 156 is released from the first and second fastening grooves 152d and 153d, the fastening pin 156 is also released from the third insertion groove 140c.

Figure 9:
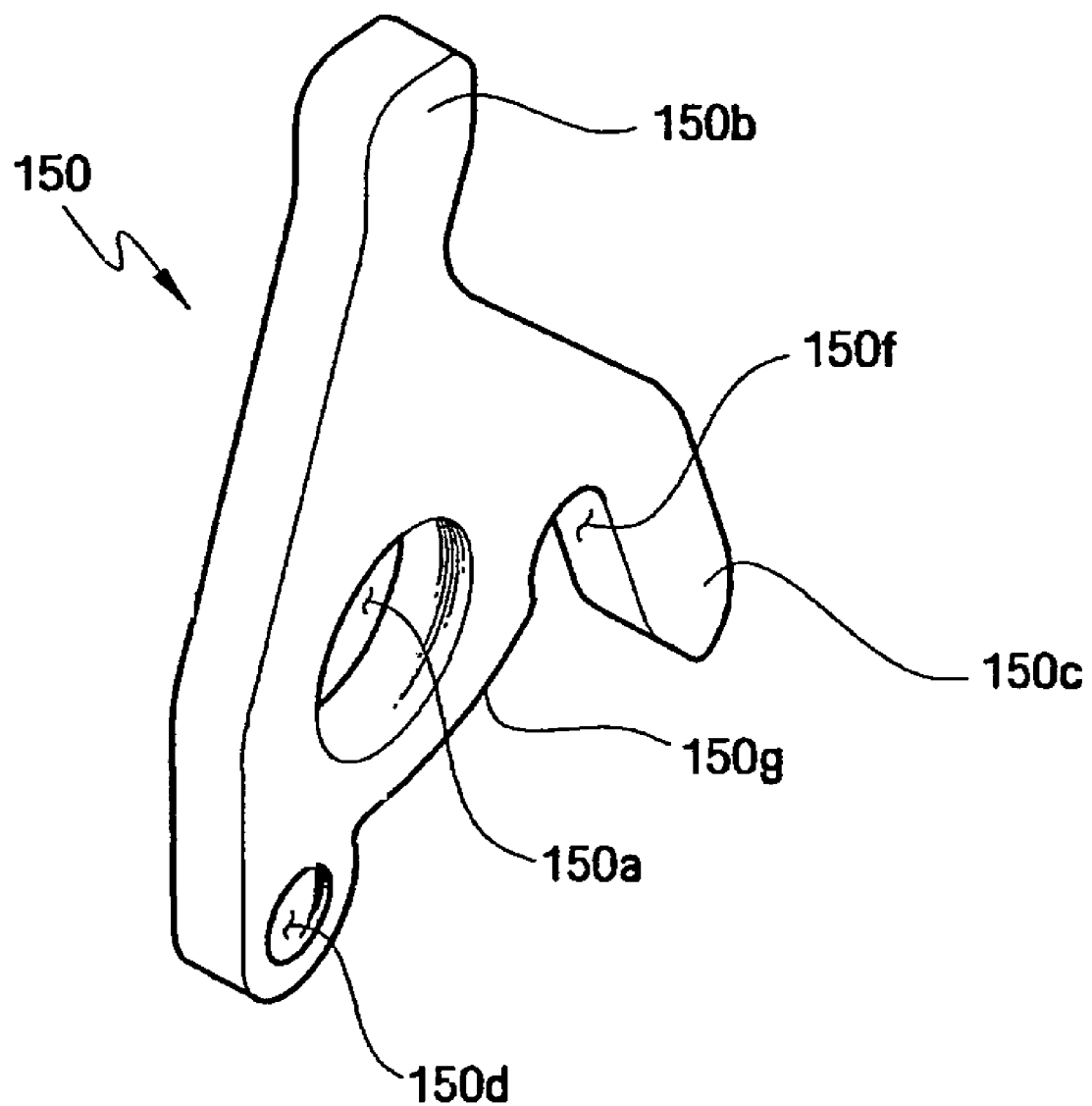
FIG. 9 is a perspective view illustrating a push-prevention means in accordance with the second embodiment of the present invention.

FIG. 9 is a perspective view illustrating the push-prevention means in accordance with the second embodiment of the present invention.

Referring to FIG. 9, the push-prevention means 150 in accordance with the second embodiment of the present invention includes the first through-hole 150a through which the pipe hinge 151 passes, the first and second arms 150b and 150c which are formed to extend in different directions when viewed from the first through-hole 150a, and the second through-hole 150d through which the fastening pin 156 passes. It is preferred that a recess 150f having a predetermined size be defined adjoining the distal end of the second arm 150c. If the recess 150f is not defined, when the brake pedal arm 140 and the push-prevention means 150 are rotated upon collision, the fastening pin 156 may not be released from the first and second fastening grooves 152d and 153d and the third insertion groove 140c. This is because, upon occurrence of the collision, the rotation radius of the brake pedal arm 140 and the rotation radius of the push-prevention means 150 may partially overlap with each other so that the brake pedal arm 140 and the push-prevention means 150 cannot be freely rotated independently of each other. It is preferred that the portion of the push-prevention means 150 that is brought into contact with the brake pedal arm 140 be rounded to allow the push-prevention means 150 to be reliably rotated upon collision. Of course, the portion of the upper end surface of the brake pedal arm 140 that is brought into contact with the push-prevention means 150 may be also rounded in conformity with the shape of the push-prevention means 150.

The second embodiment of the present invention will be described on the assumption that, when the push-prevention means 150 is hingedly coupled to the first and second brackets 120 and 130, the first arm 150b is positioned to face the first bracket 120 and the second arm 150c is positioned to face the brake pedal arm 140. The first and second arms 150b and 150c are formed to have lengths which is greater than the length between the first through-hole 150a and the first bracket 120 and the length between the first through-hole 150a and the brake pedal arm 140, respectively.

When an impact force is transmitted from the dash panel 110 to the push-prevention means 150, the first arm 150b collides against the first bracket 120, and as a result, the push-prevention means 150 is rotated in a direction opposite to a direction in which the impact force is transmitted.

At this time, as the fastening pin 156 is released from the first and second fastening grooves 152d and 153d of the first and second brackets 152 and 153 and the third insertion grooves 140c, the push-prevention means 150 is rotated.

Due to the rotation of the push-prevention means 150, the second arm 150c collides against a side of the brake pedal arm 140, and the brake pedal arm 140 is rotated. As a consequence, as the brake pedal arm 140 is rotated in a direction opposite to the direction in which the push-prevention means 150 is rotated, the brake pedal arm 140 is prevented from being pushed rearward.

Concretely speaking, if a head-on collision occurs, as the dash panel 110 is pushed toward the inside of the vehicle by the impact force applied to the vehicle body, the impact force is transmitted to the brake pedal arm 140 via the second bracket 130 and the pushrod 142.

At this time, the flange bolt 131 which is inserted through the first insertion groove 121 of the first bracket 120 is released from the first insertion groove 121, and the second bracket 130 is decoupled from the first bracket 120. The push-prevention means 150 which is hingedly coupled to the second bracket 130 is also pushed rearward by the impact force transmitted to the second bracket 130, and the first arm 150b collides on the first bracket 120. Since the second bracket 130 is inclinedly coupled to the first bracket 120, when the impact force is transmitted, the second bracket 130 is rotated in the predetermined direction, and is decoupled from the first bracket 120.

Accordingly, as the second arm 150c collides against the brake pedal arm 140 due to the rotation of the push-prevention means 150, the brake pedal arm 140 is rotated and prevented from being pushed inward.

As described above, if the head-on collision occurs, the fastening pin 156 is completely released from the first and second fastening grooves 152d and 153d and the third insertion groove 140c, and the second arm 150c collides against the side of the brake pedal arm 140, whereby the brake pedal arm 140 is rotated.

Figure 10:
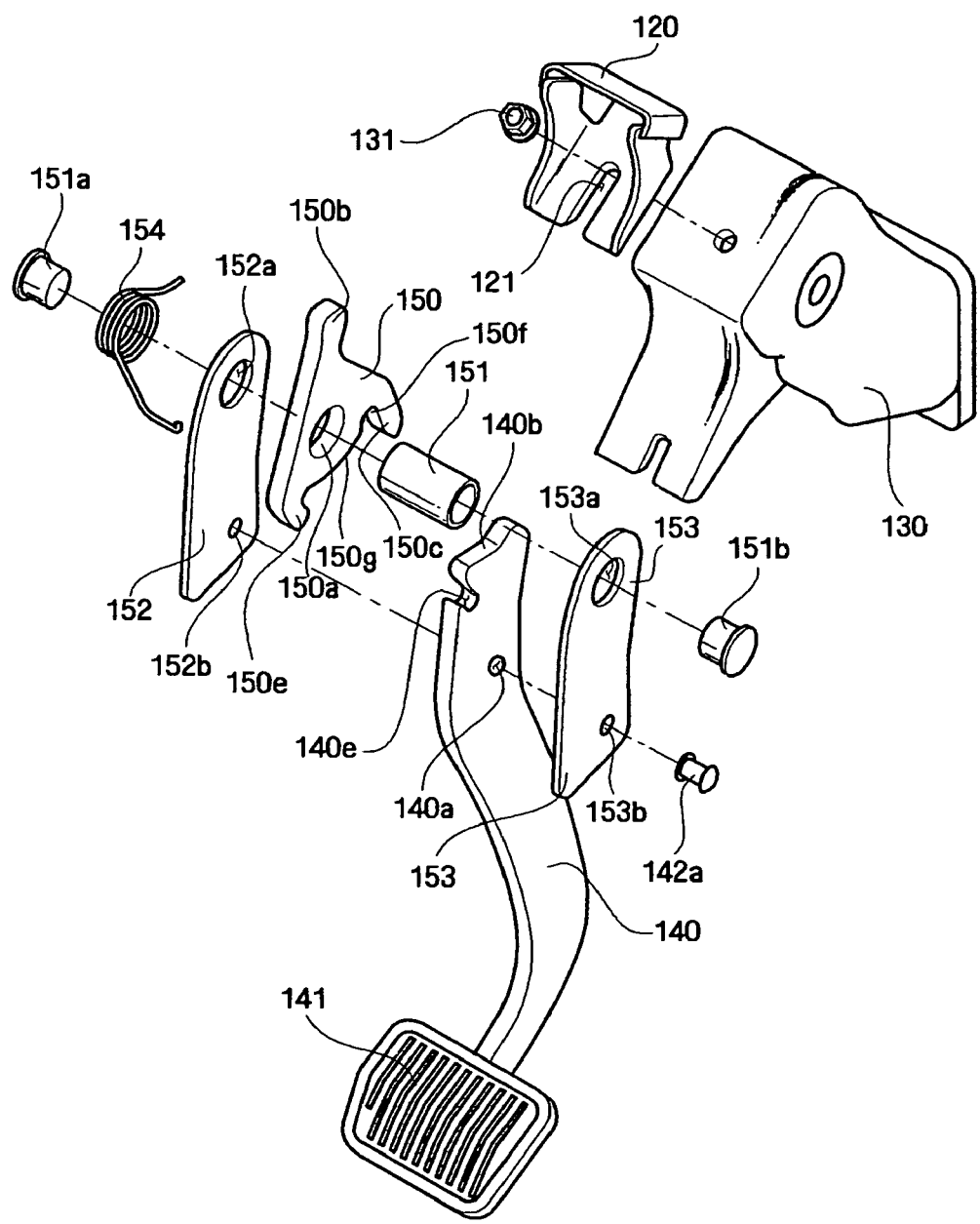
FIG. 10 is an exploded perspective view illustrating an apparatus for preventing the brake pedal of a vehicle from being pushed rearward in accordance with a third embodiment of the present invention.
Figure 11:
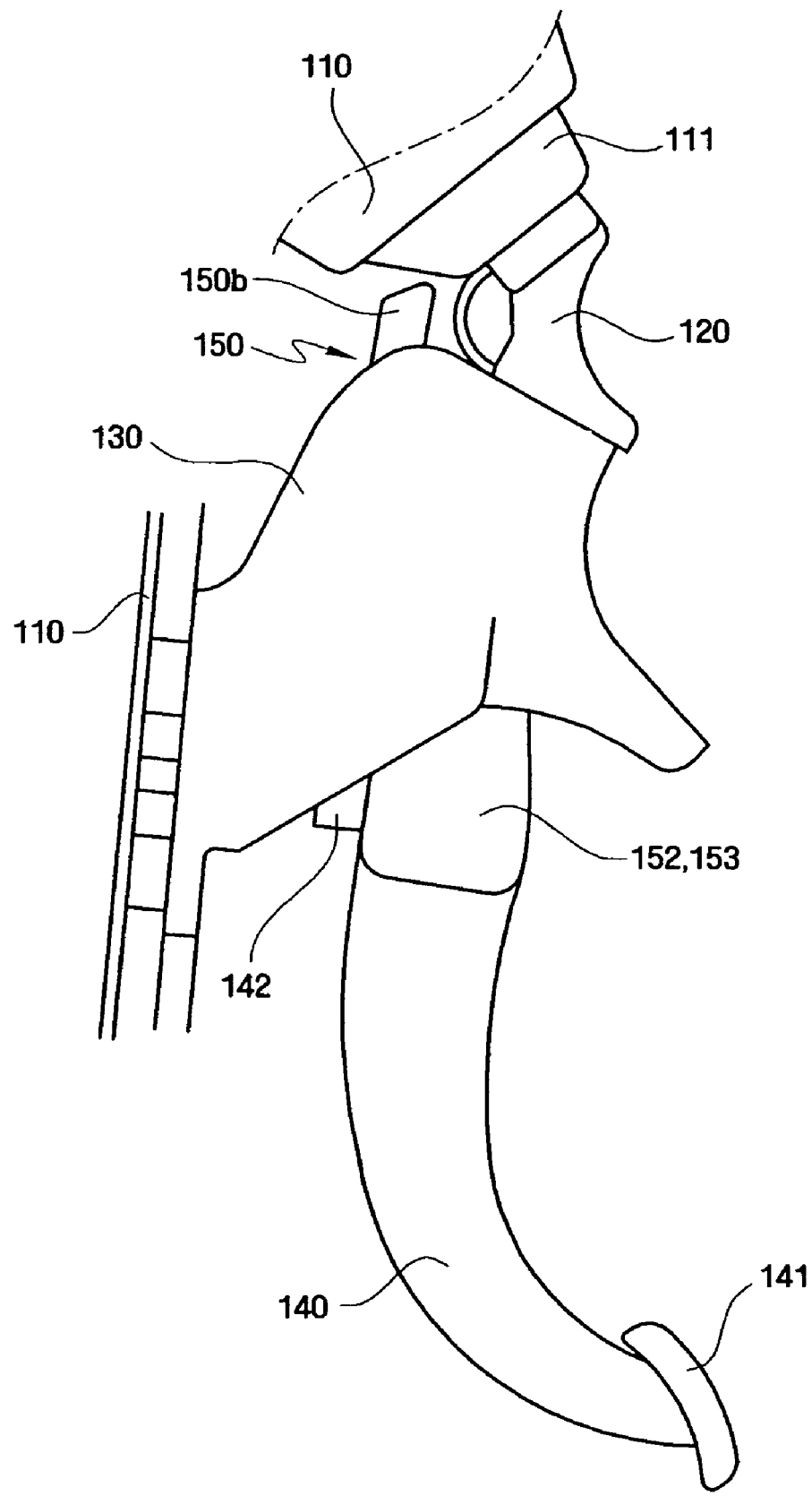
FIG. 11 is a side view illustrating the apparatus for preventing the brake pedal of a vehicle from being pushed rearward in accordance with the third embodiment of the present invention.

FIG. 10 is an exploded perspective view illustrating an apparatus for preventing the brake pedal of a vehicle from being pushed rearward in accordance with a third embodiment of the present invention, and FIG. 11 is a side view illustrating the apparatus for preventing the brake pedal of a vehicle from being pushed rearward in accordance with the third embodiment of the present invention.

Referring to FIGS. 10 and 11, the apparatus for preventing the brake pedal of a vehicle from being pushed rearward in accordance with the third embodiment of the present invention includes a first bracket 120 fastened to a cowl 111 which is installed on a dash panel 110, a second bracket 130 coupled to the first bracket 120 and connected to the master vac (not shown) which is positioned beyond the dash panel 110, a brake pedal arm 140 having a brake pedal 141 which is formed on the distal end thereof and connected to a pushrod 142 which is fastened to the master vac, and push-prevention means 150 rotatably coupled to the second bracket 130 through a pipe hinge 151 to rotate the brake pedal arm 140 in a predetermined direction through the rotation of the push-prevention means 150.

The second bracket 130 is coupled to the first bracket 120 by a flange bolt 131 which is inserted through the first insertion groove 121 defined in the first bracket 120. When a head-on collision occurs, the flange bolt 131 is released from the first insertion groove 121 by an impact force transmitted through the dash panel 110, and the second bracket 130 is decoupled from the first bracket 120. The coupling surfaces of the first and second brackets 120 and 130 are inclined downward in a direction in which the impact force is transmitted. Therefore, when an impact force is transmitted from the front part of a vehicle, the second bracket 130 is rotated in a predetermined direction and is decoupled from the first bracket 120.

First and second support brackets 152 and 153 are respectively positioned on both sides of the brake pedal arm 140 and are hingedly coupled to the brake pedal arm 140 through the pipe hinge 151. The first and second support brackets 152 and 153 are respectively defined with first and second coupling holes 152a and 153a through which the hinge pipe 151 passes. Release prevention members 151a and 151b for preventing the release of the pipe hinge 151 are coupled to both ends of the pipe hinge 151 which has passed through the first and second coupling holes 152a and 153a.

A return spring 154 is disposed on a side of the first support bracket 152. After a driver steps on the brake pedal 141 and the brake pedal arm 140 is rotated in a direction, if the driver removes the force applied to the brake pedal 141, the return spring 154 returns the brake pedal arm 140 to its original position.

The first and second support brackets 152 and 153 are defined with third and fourth coupling holes 152b and 153b through which a coupling pin 142a passes. The coupling pin 142a also passes through a seventh coupling hole 140a which is defined in the brake pedal arm 140, to couple the brake pedal arm 140 to the pushrod 142.

The push-prevention means 150 includes a first through-hole 150a through which the pipe hinge 151 passes, first and second arms 150b and 150c which are formed to extend in different directions when viewed from the first through-hole 150a, and an insertion projection 150e which is inserted into a portion of the upper end of the brake pedal arm 140 and restrains the movement of the brake pedal arm 140. The insertion projection 150e is formed such that the insertion projection 150e extends from the position of the first through-hole 150a toward the inside of the vehicle and then the distal end portion of the insertion projection 150e is bent toward the brake pedal arm 140. A fourth insertion groove 140e is defined on the upper end of the brake pedal arm 140 such that the distal end of the insertion projection 150e can be fitted into the fourth insertion groove 140e. The fourth insertion groove 140e is defined in a manner such that it is opened toward the passenger compartment of the vehicle to allow the insertion projection 150e to be fitted into the fourth insertion groove 140e from the passenger compartment.

If an impact force is transmitted from the dash panel 110 to the push-prevention means 150, the first arm 150b collides against the first bracket 120, and, as a result, the push-prevention means 150 is rotated in a direction opposite to a direction in which the impact force is transmitted. Therefore, with the insertion projection 150e fitted into the fourth insertion groove 140e to support the brake pedal arm 140 in normal times during which a vehicle travels, if the push-prevention means 150 is rotated, the insertion projection 150e is released from the fourth insertion groove 140e, and the brake pedal arm 140 is ready to be rotated.

If the insertion projection 150e is released from the fourth insertion groove 140e, due to the rotation of the push-prevention means 150, the second arm 150c collides against a side of the brake pedal arm 140, and the brake pedal arm 140 is rotated in a direction opposite to a direction in which the push-prevention means 150 is rotated.

Figure 12:
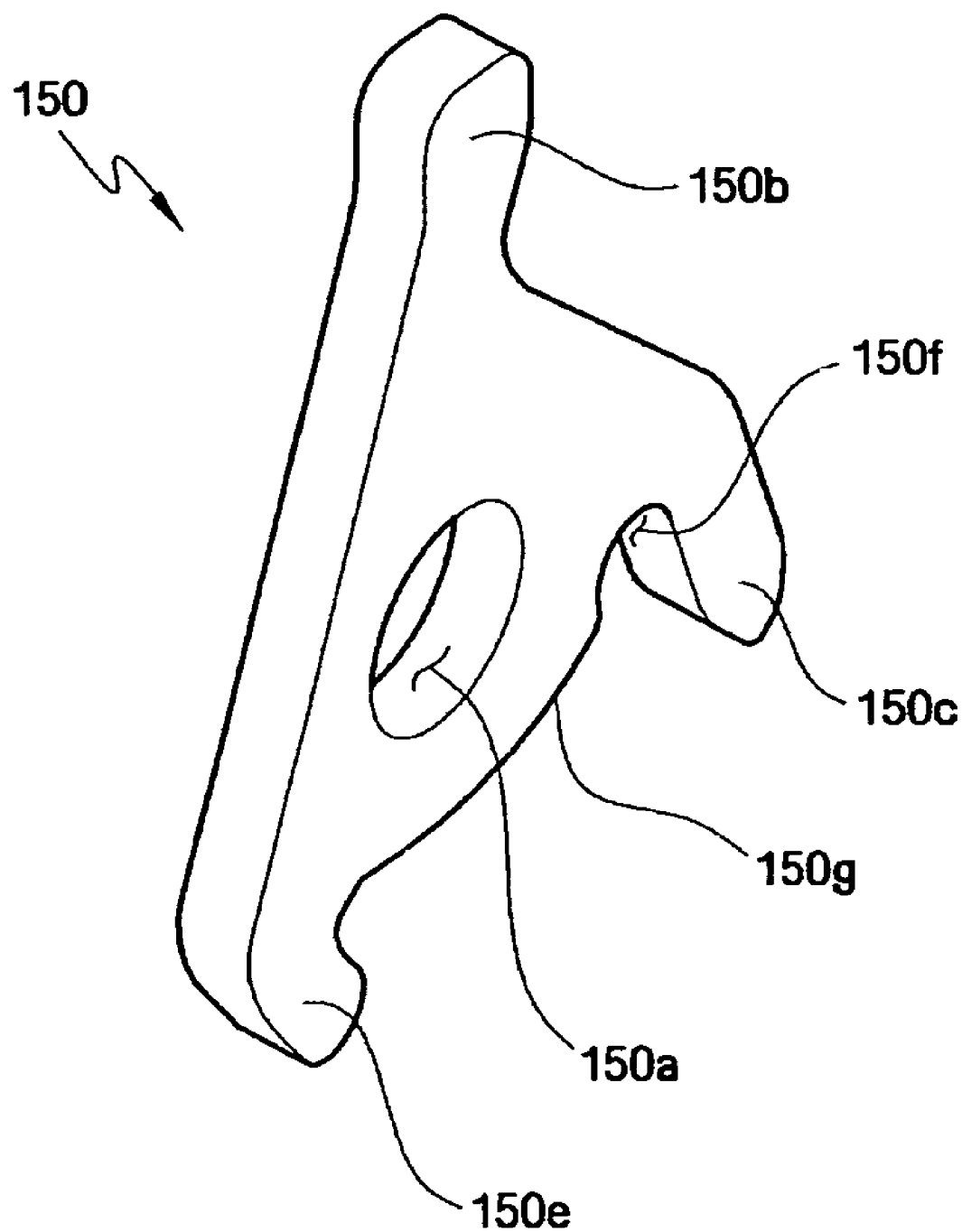
FIG. 12 is a perspective view illustrating a push-prevention means in accordance with the third embodiment of the present invention.

FIG. 12 is a perspective view illustrating the push-prevention means in accordance with the third embodiment of the present invention.

Referring to FIG. 12, the push-prevention means 150 in accordance with the third embodiment of the present invention includes the first through-hole 150a through which the pipe hinge 151 passes, the first and second arms 150b and 150c which are formed to extend in different directions when viewed from the first through-hole 150a, and the insertion projection 150e which is fitted into the fourth insertion groove 140e of the brake pedal arm 140. At this time, the insertion projection 150e is formed such that the insertion projection 150e extends from the position of the first through-hole 150a toward the inside of the vehicle and then the distal end portion of the insertion projection 150e is bent toward the brake pedal arm 140. While it is described in the present embodiment of the present invention that the insertion projection 150e is formed in the shape of "<" such that the insertion projection 150e extends from the position of the first through-hole 150a toward the inside of the vehicle and then the distal end portion of the insertion projection 150e is bent toward the brake pedal arm 140, this serves as an example for helping to understand the present invention, and therefore the insertion projection 150e may be formed to have various shapes such as an "S" which is curved twice. Also, it is preferred that a recess 150f having a predetermined size be defined adjoining the distal end of the second arm 150c. If the recess 150f is not defined, when the brake pedal arm 140 and the push-prevention means 150 are rotated upon collision, the insertion projection 150e may not be released from the fourth insertion groove 140e. This is because, upon occurrence of the collision, the rotation radius of the brake pedal arm 140 and the rotation radius of the push-prevention means 150 may partially overlap with each other so that the brake pedal arm 140 and the push-prevention means 150 cannot be freely rotated independently of each other. It is preferred that the portion of the push-prevention means 150 which is brought into contact with the brake pedal arm 140 be rounded to allow the push-prevention means 150 to be reliably rotated upon collision. Of course, the portion of the upper end surface of the brake pedal arm 140 which is brought into contact with the push-prevention means 150 may be also rounded in conformity with the shape of the push-prevention means 150.

The third embodiment of the present invention will be described on the assumption that, when the push-prevention means 150 is hingedly coupled to the first and second brackets 120 and 130, the first arm 150b is positioned to face the first bracket 120 and the second arm 150c is positioned to face the brake pedal arm 140. The first and second arms 150b and 150c are formed to have lengths which are greater than the length between the first through-hole 150a and the first bracket 120 and the length between the first through-hole 150a and the brake pedal arm 140, respectively.

When an impact force is transmitted from the dash panel 110 to the push-prevention means 150, the first arm 150b collides against the first bracket 120, and as a result, the push-prevention means 150 is rotated in a direction opposite to a direction in which the impact force is transmitted. At this time, as the insertion projection 150e is released from the fourth insertion groove 140e, the brake pedal arm 140 is ready to be rotated.

Due to the rotation of the push-prevention means 150, the second arm 150c collides against a side of the brake pedal arm 140, and the brake pedal arm 140 is rotated. As a consequence, as the brake pedal arm 140 is rotated in a direction opposite to the direction in which the push-prevention means 150 is rotated, the brake pedal arm 140 is prevented from being pushed rearward.

If a head-on collision occurs, as the dash panel 110 is pushed toward the inside of the vehicle by the impact force applied to the vehicle body, the impact force is transmitted to the brake pedal arm 140 via the second bracket 130 and the pushrod 142.

At this time, the flange bolt 131 which is inserted through the first insertion groove 121 of the first bracket 120 is released from the first insertion groove 121, and the second bracket 130 is decoupled from the first bracket 120. The push-prevention means 150 which is hingedly coupled to the second bracket 130 is also pushed rearward by the impact force transmitted to the second bracket 130, and the first arm 150b collides on the first bracket 120. Since the second bracket 130 is inclinedly coupled to the first bracket 120, when the impact force is transmitted, the second bracket 130 is rotated in the predetermined direction, and is decoupled from the first bracket 120. Also, the insertion projection 150e of the push-prevention means 150 is released from the fourth insertion groove 140e.

Accordingly, as the second arm 150c collides against the brake pedal arm 140 due to the rotation of the push-prevention means 150, and the brake pedal arm 140 is rotated and prevented from being pushed inward.

Figure 13:
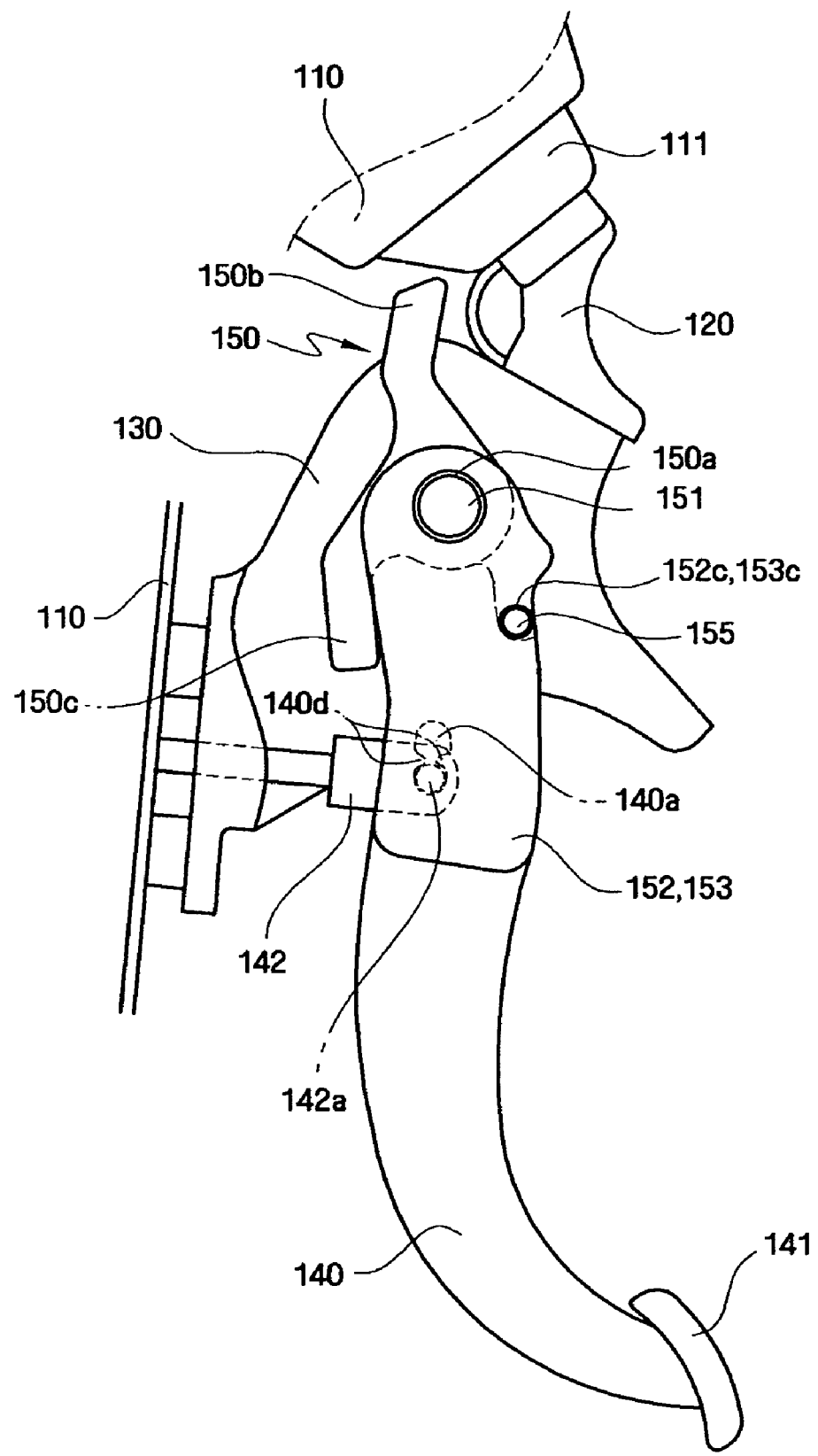
FIG. 13 is a side view illustrating the normal positions of the push-prevention means and a brake pedal arm in accordance with the first embodiment of the present invention.

FIG. 13 is a side view illustrating the positions of the push-prevention means and the brake pedal arm in accordance with the first embodiment of the present invention.

Referring to FIG. 13, during normal times, the first arm 150b of the push-prevention means 150, which is hingedly coupled to the second bracket 130, is held at a predetermined separation from the first bracket 120, and, as a result, the push-prevention means 150 is not rotated. Accordingly, as the second arm 150c is not rotated, the second arm 150c is prevented from colliding against the brake pedal arm 140, whereby the brake pedal arm 140 is not rotated. At this time, the support pin 155, which is fitted into the third insertion groove 140c of the brake pedal arm 140, supports the brake pedal arm 140.

In the present embodiment, during normal operation the coupling pin 142a is positioned in the lower part of the seventh coupling hole 140a which has a smaller diameter, so that the brake pedal arm 140 does not move downward.

Figure 14:
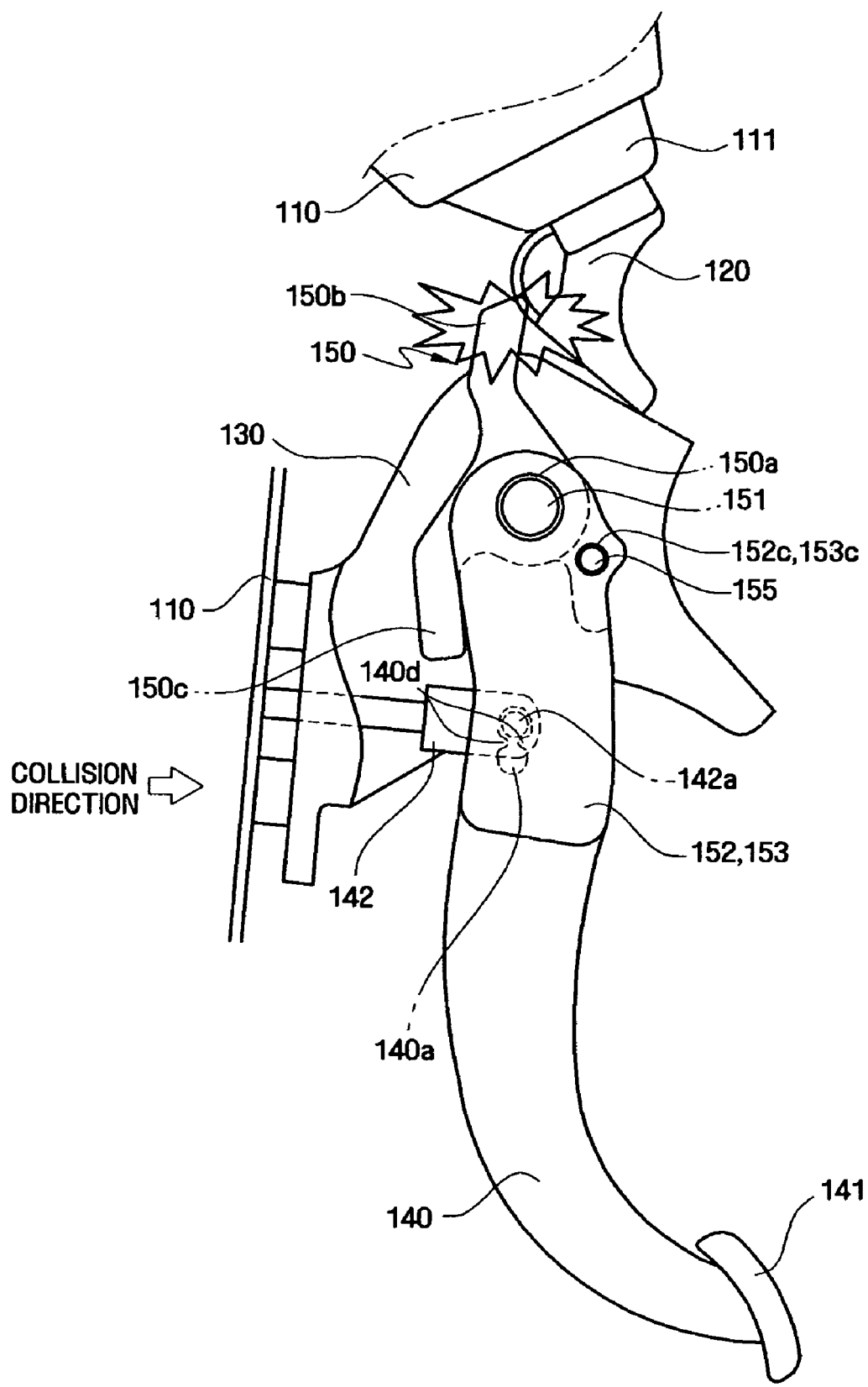
FIG. 14 is a side view illustrating the positions of the push-prevention means and the brake pedal arm after a head-on collision occurs in accordance with the first embodiment of the present invention immediately.

FIG. 14 is a side view illustrating the positions of the push-prevention means and the brake pedal arm immediately after a head-on collision occurs in accordance with the first embodiment of the present invention.

Referring to FIG. 14, if a head-on collision occurs, as the dash panel 110 is pushed into the vehicle by the impact force applied to the vehicle body, the impact force is transmitted to the brake pedal arm 140 via the second bracket 130 and the pushrod 142. At this time, as the second bracket 130 is rotated in the predetermined direction due to the inclined coupling between the first and second brackets 120 and 130, the second bracket 130 is decoupled from the first bracket 120. As a consequence, the brake pedal arm 140 moves downward, and the support pin 155 is released from the third insertion groove 140c. Further, when the brake pedal arm 140 moves downward, the movement-restraining projections 140d of the seventh coupling hole 140a are broken, by which the coupling pin 142a is moved to the upper part of the seventh coupling hole 140a.

Moreover, as the first arm 150b of the push-prevention means 150 collides against the first bracket 120, the push-prevention means 150 is rotated in a direction opposite to the direction in which the impact force is transmitted, and the second arm 150c collides against the brake pedal arm 140. At this time, since the support pin 155 is released from the third insertion groove 140c of the brake pedal arm 140, the brake pedal arm 140 is ready to be rotated by the collision of the second arm 150c.

Figure 15:
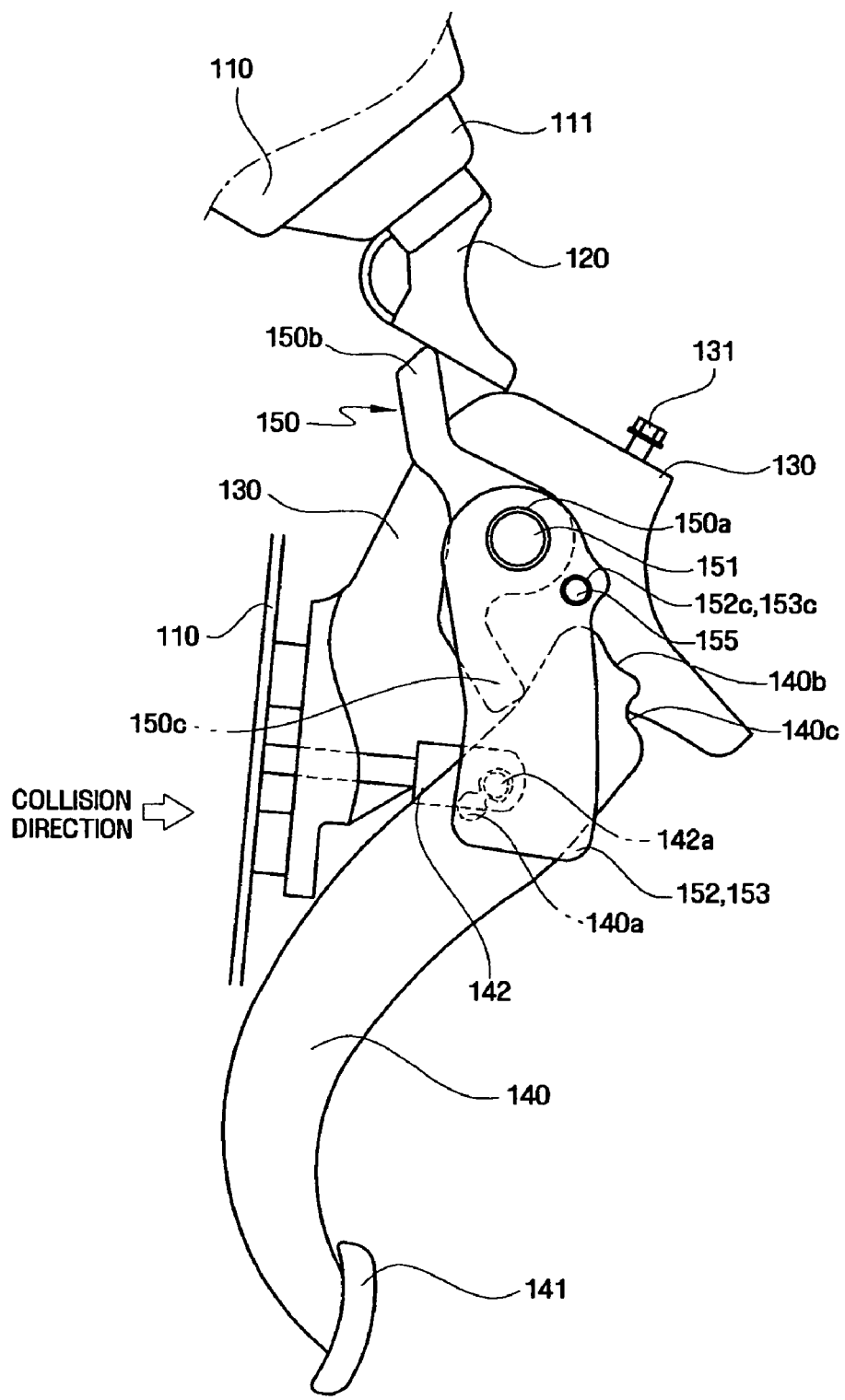
FIG. 15 is a side view illustrating the position of a brake pedal after the second bracket is decoupled from the first bracket in accordance with the first embodiment of the present invention.

FIG. 15 is a side view illustrating the position of the brake pedal after the second bracket is decoupled from the first bracket in accordance with the first embodiment of the present invention.

Referring to FIG. 15, as the impact force is continuously transmitted, the flange bolt 131, which has started to be released from the first insertion groove 121 of the bracket 120, is completely released from the first insertion groove 121 of the first bracket 120.

At this time, as the second bracket 130 is decoupled from the first bracket 120, the rotation angle of the push-prevention means 150 gradually increases. Consequently, as the second arm 150c is rotated toward the brake pedal arm 140, the second arm 150c finally collides against the brake pedal arm 140 and rotates the brake pedal arm 140 in a direction opposite to the direction in which the push-prevention means 150 is rotated.

Therefore, the brake pedal 141 is prevented from being pushed inward and is rotated in the direction opposite to the direction in which the push-prevention means 150 is rotated. As a result, it is possible to prevent the brake pedal 141 from being pushed rearward and the driver from being injured by the brake pedal arm 140 including the brake pedal 141.

Figure 16:
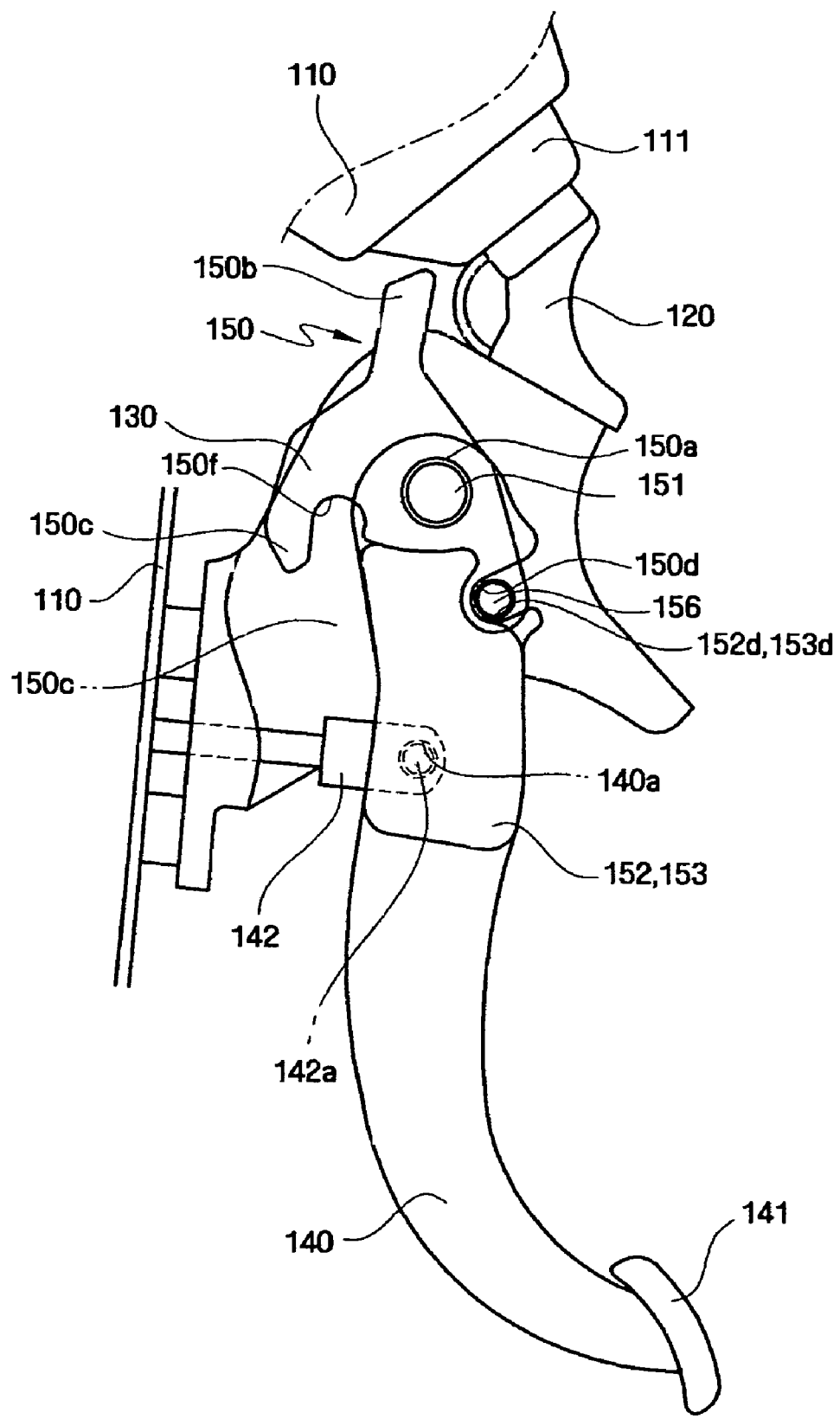
FIG. 16 is a side view illustrating normal positions of the push-prevention means and a brake pedal arm in accordance with the second embodiment of the present invention.

FIG. 16 is a side view illustrating the positions of the push-prevention means and a brake pedal arm during normal operation in accordance with the second embodiment of the present invention.

Referring to FIG. 16, in normal times during which a vehicle travels, the first arm 150b of the push-prevention means 150, which is hingedly coupled to the second bracket 130, is held at a predetermined separation from the first bracket 120, and the fastening pin 156 is fitted into the first and second fastening grooves 152d and 153d of the first and second support brackets 152 and 153 and into the third insertion groove 140c of the brake pedal arm 140.

As a result, the push-prevention means 150 is not rotated. Accordingly, the second arm 150c is prevented from colliding against the brake pedal arm 140, and the brake pedal arm 140 is not rotated in the predetermined direction.

Figure 17:
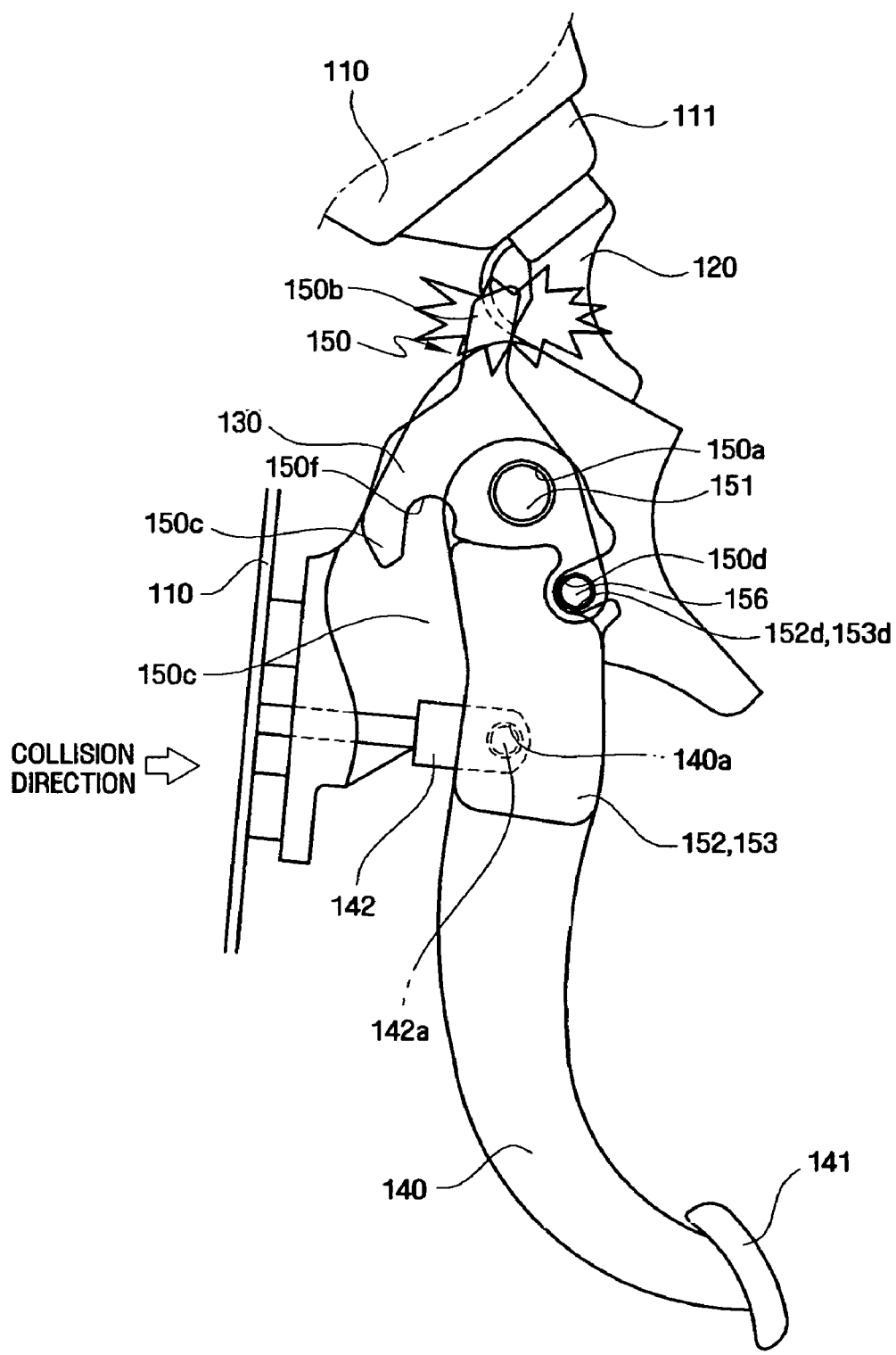
FIG. 17 is a side view illustrating the positions of the push-prevention means and the brake pedal arm immediately after a head-on collision occurs in accordance with the second embodiment of the present invention.

FIG. 17 is a side view illustrating the positions of the push-prevention means and the brake pedal arm immediately after a head-on collision occurs in accordance with the second embodiment of the present invention.

Referring to FIG. 17, if a head-on collision occurs, as the dash panel 110 is pushed into the vehicle by the impact force applied to the vehicle body, the impact force is transmitted to the brake pedal arm 140 via the second bracket 130 and the pushrod 142.

At this time, as the push-prevention means 150 hingedly coupled to the second bracket 130 is also pushed into the vehicle, the first arm 150b collides against the first bracket 120. Also, as the first arm 150b collides against the first bracket 120, the push-prevention means 150 is rotated in a direction opposite to the direction in which the impact force is transmitted. At the same time, the flange bolt 131 connected to the second bracket 130 starts to be rotated and released from the first insertion groove 121 of the first bracket 120 due to the inclined coupling between the first and second brackets 120 and 130.

Figure 18:
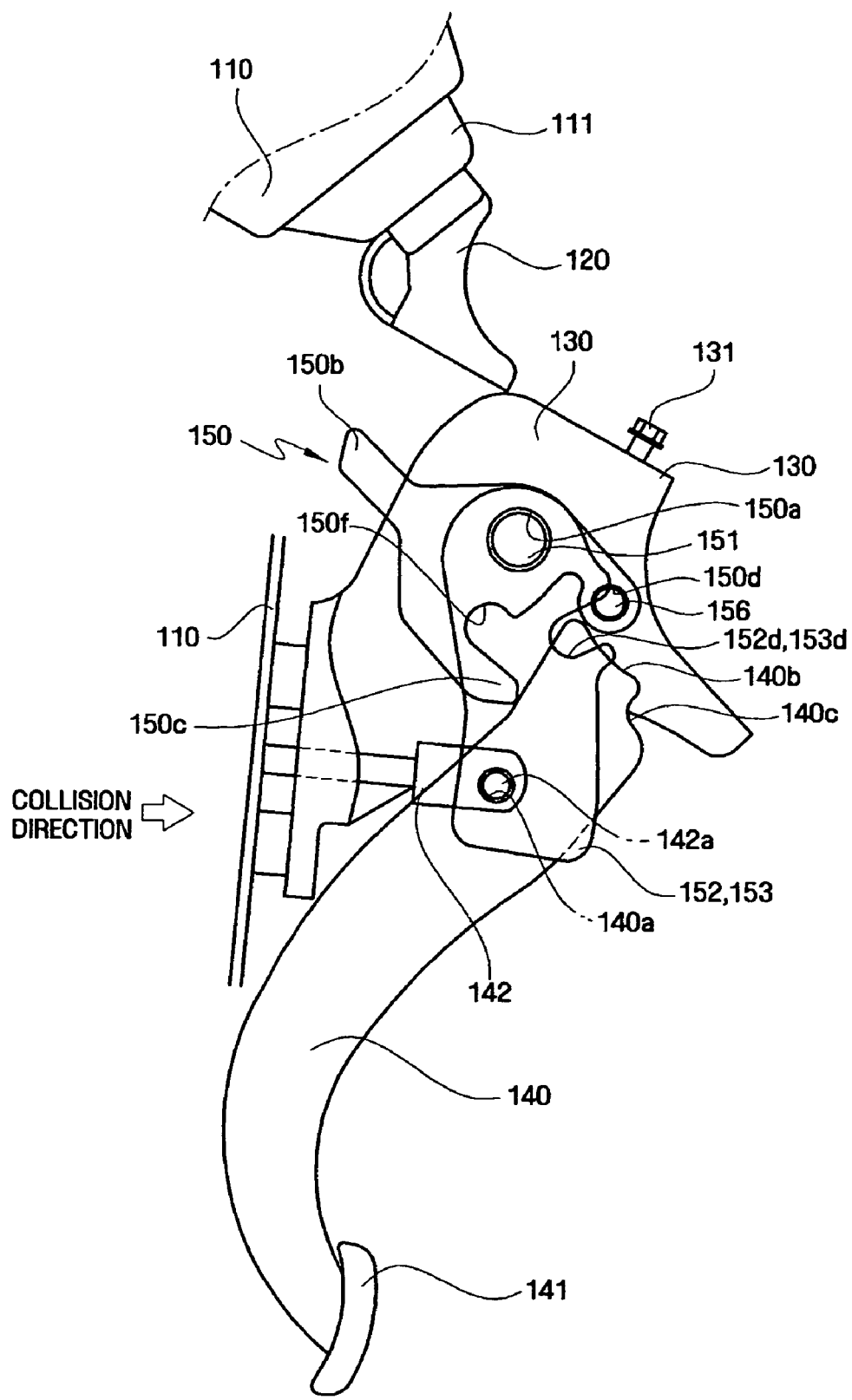
FIG. 18 is a side view illustrating the position of a brake pedal after the second bracket is decoupled from the first bracket in accordance with the second embodiment of the present invention.

FIG. 18 is a side view illustrating the position of a brake pedal after the second bracket is decoupled from the first bracket in accordance with the second embodiment of the present invention.

Referring to FIG. 18, as the impact force is continuously transmitted, the flange bolt 131, which has started to be released from the first insertion groove 121 of the bracket 120 in FIG. 17, is completely released from the first insertion groove 121 of the first bracket 120.

Also, the fastening pin 156 is completely released from the first and second fastening grooves 152d and 153d of the first and second support brackets 152 and 153.

At this time, as the second bracket 130 is decoupled from the first bracket 120, the rotation angle of the push-prevention means 150 gradually increases. Consequently, as the second arm 150c is rotated toward the brake pedal arm 140, the second arm 150c finally collides against the brake pedal arm 140 and rotates the brake pedal arm 140 in a direction opposite to the direction in which the push-prevention means 150 is rotated.

Therefore, the brake pedal 141 is prevented from being pushed inward and is rotated in the direction opposite to the direction in which the push-prevention means 150 is rotated. As a result, it is possible to prevent the brake pedal 141 from being pushed rearward and the driver from being injured by the brake pedal arm 140 including the brake pedal 141. Further, because the pipe hinge 151 and the fastening pin 156 are completely released from the second and third insertion grooves 140b and 140c of the brake pedal arm 140, respectively, the brake pedal 141 completely loses its functionality.

Figure 19:
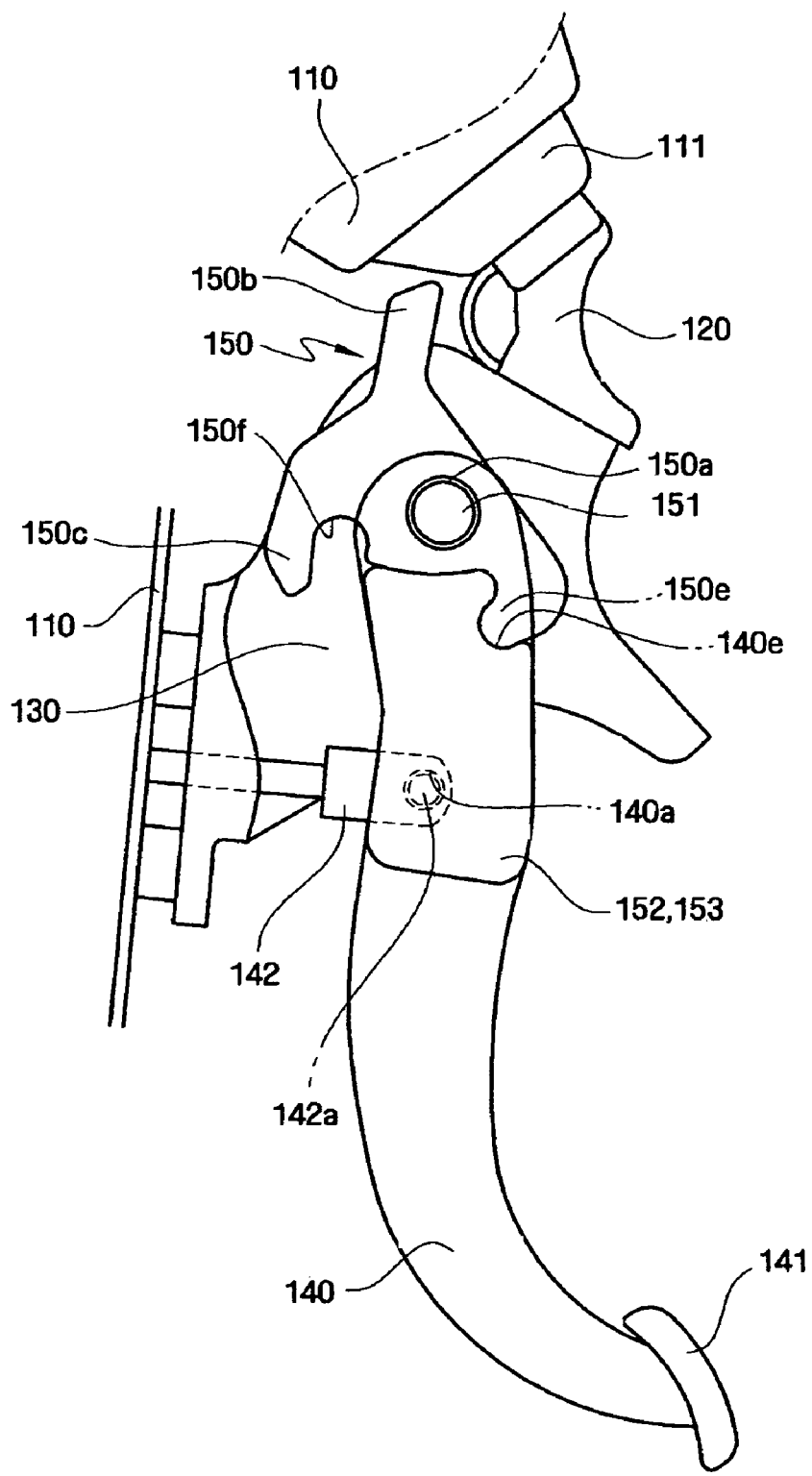
FIG. 19 is a side view illustrating normal positions of the push-prevention means and a brake pedal arm in accordance with the third embodiment of the present invention.

FIG. 19 is a side view illustrating the positions of the push-prevention means and a brake pedal arm during normal operation in accordance with the third embodiment of the present invention.

Referring to FIG. 19, during normal operation, the first arm 150b of the push-prevention means 150, which is hingedly coupled to the second bracket 130, is held at a predetermined separation from the first bracket 120, and the insertion projection 150e of the push-prevention means 150 is fitted into the fourth insertion groove 140e of the brake pedal arm 140 to support the brake pedal arm 140.

Figure 20:
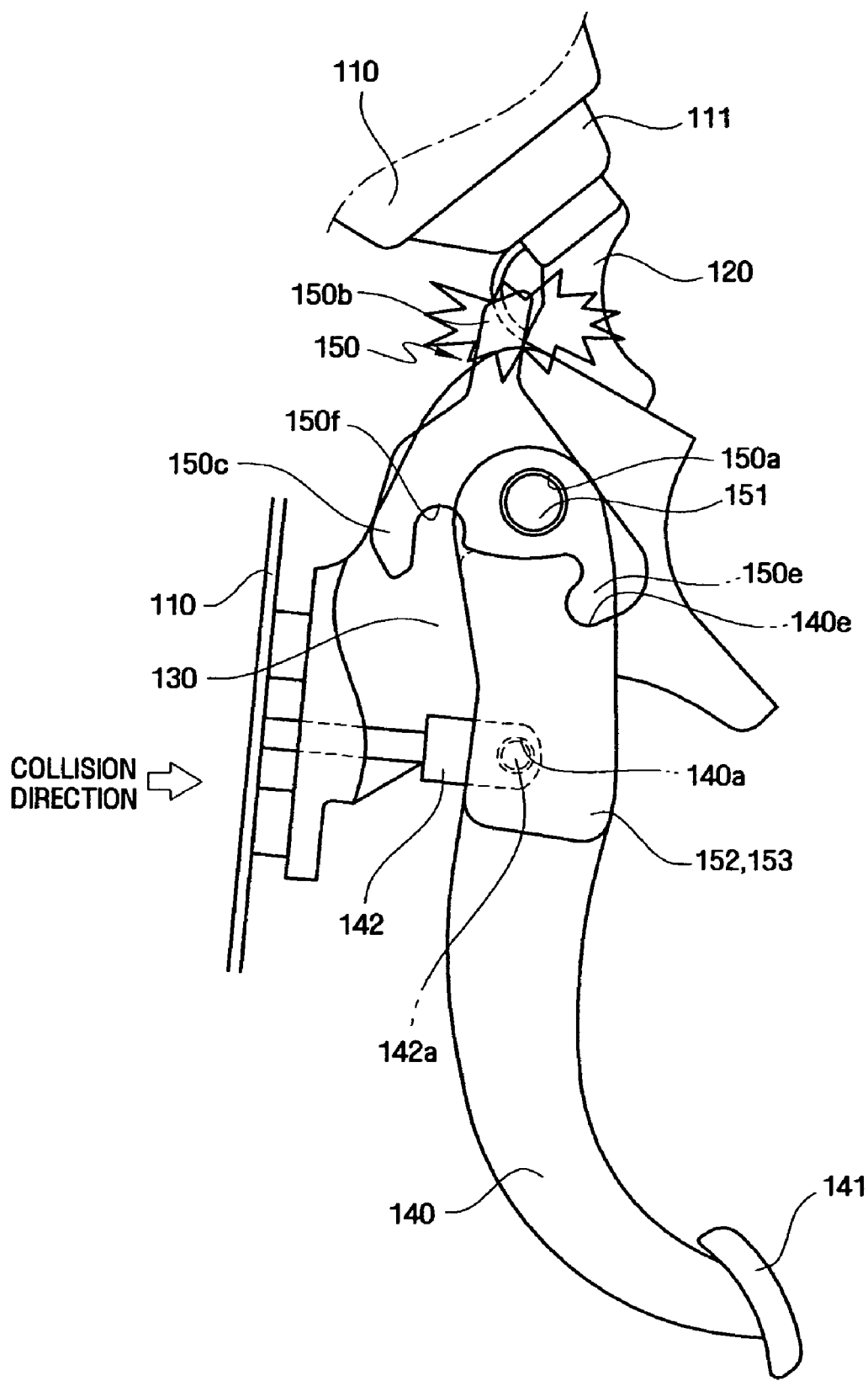
FIG. 20 is a side view illustrating the positions of the push-prevention means and the brake pedal arm in accordance with the third embodiment of the present invention immediately after a head-on collision occurs.

FIG. 20 is a side view illustrating the positions of the push-prevention means and the brake pedal arm immediately after a head-on collision occurs in accordance with the third embodiment of the present invention.

Referring to FIG. 20, if a head-on collision occurs, as the dash panel 110 is pushed into the vehicle by the impact force applied to the vehicle body, the impact force is transmitted to the brake pedal arm 140 via the second bracket 130 and the pushrod 142.

At this time, as the push-prevention means 150 hingedly coupled to the second bracket 130 is also pushed into the vehicle, the first arm 150b collides against the first bracket 120. Also, as the first arm 150b collides against the first bracket 120, the push-prevention means 150 is rotated in a direction opposite to the direction in which the impact force is transmitted. At the same time, the flange bolt 131 connected to the second bracket 130 starts to be rotated and released from the first insertion groove 121 of the first bracket 120 due to the inclined coupling between the first and second brackets 120 and 130. Further, as the push-prevention means 150 is rotated in the direction opposite to the direction in which the impact force is transmitted, the insertion projection 150e starts to be released from the fourth insertion groove 140e.

Figure 21:
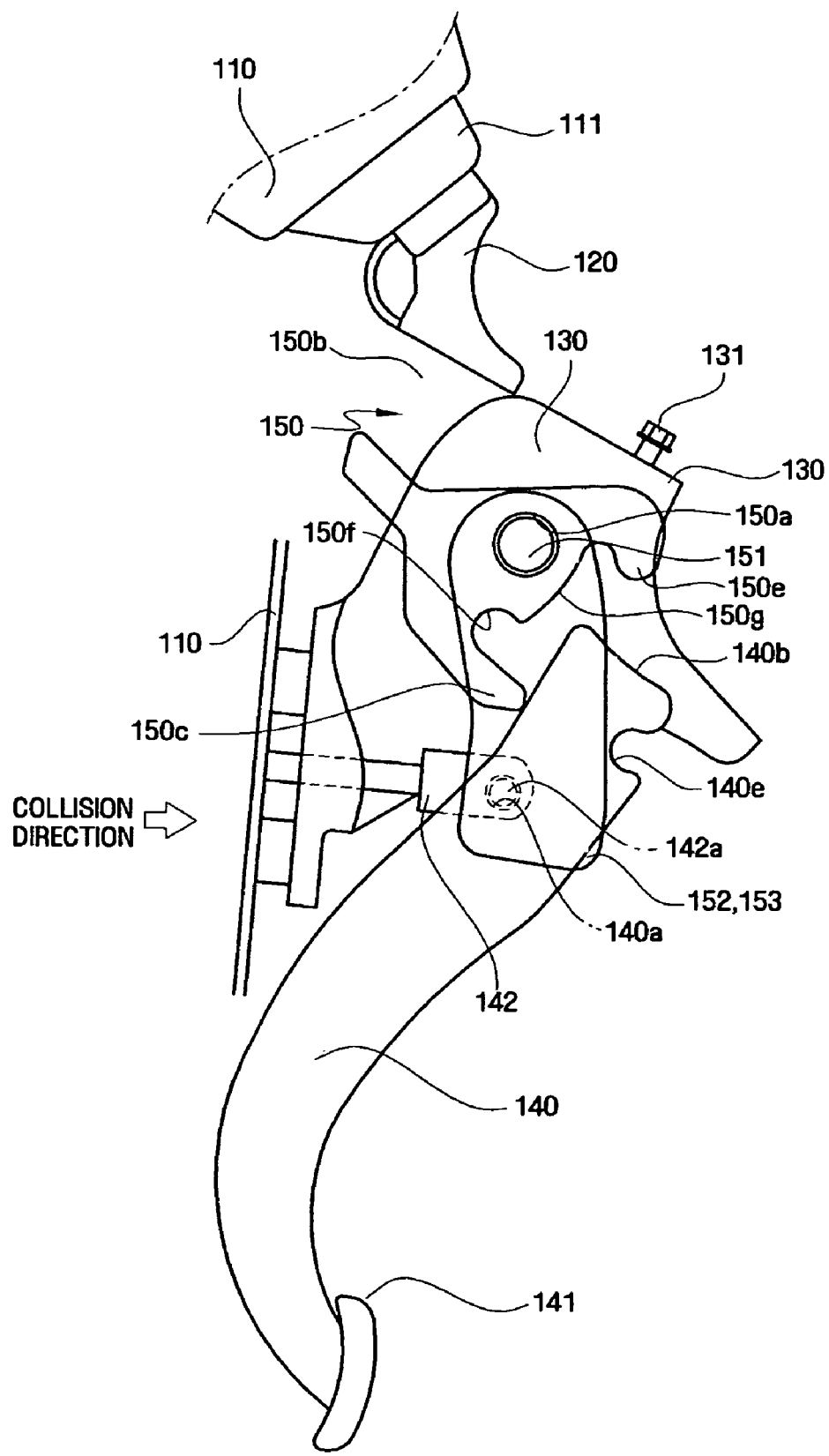
FIG. 21 is a side view illustrating the position of a brake pedal after the second bracket is decoupled from the first bracket in accordance with the third embodiment of the present invention.

FIG. 21 is a side view illustrating the position of a brake pedal after the second bracket is decoupled from the first bracket in accordance with the third embodiment of the present invention.

Referring to FIG. 21, as the impact force is continuously transmitted, the flange bolt 131, which has started to be released from the first insertion groove 121 of the bracket 120 in FIG. 20, is completely released from the first insertion groove 121 of the first bracket 120.

At this time, as the second bracket 130 is decoupled from the first bracket 120, the rotation angle of the push-prevention means 150 gradually increases. Consequently, the insertion projection 150e which supports the brake pedal arm 140 is completely released from the fourth insertion groove 140e of the brake pedal arm 140, and the brake pedal arm 140 is ready to be rotated.

After the insertion projection 150e which supports the brake pedal arm 140 is completely released from the fourth insertion groove 140e of the brake pedal arm 140, by the rotation of the push-prevention means 150, the second arm 150c is rotated toward the brake pedal arm 140. Thereupon, the second arm 150c finally collides against the brake pedal arm 140, and rotates the brake pedal arm 140 in the direction opposite to the direction in which the push-prevention means 150 is rotated.

Therefore, the brake pedal 141 is prevented from being pushed inward and is rotated in the direction opposite to the direction in which the push-prevention means 150 is rotated. As a result, it is possible to prevent the brake pedal 141 from being pushed rearward and the driver from being injured by the brake pedal arm 140 including the brake pedal 141. Further, because the insertion projection 150e which supports the brake pedal arm 140 is completely released from the fourth insertion groove 140e of the brake pedal arm 140, the brake pedal 141 completely loses its functionality.

As is apparent from the above description, the apparatus for preventing the brake pedal of a vehicle from being pushed rearward according to the present invention provides advantages in that, when a collision occurs, a brake pedal arm is prevented from being pushed rearward by a pushrod, and a driver is prevented from being injured.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for preventing a brake pedal of a vehicle from being pushed rearward, the apparatus comprising:
   a first bracket fastened to a cowl;
   a second bracket coupled to the first bracket and a master vac positioned beyond a dash panel;
   a brake pedal arm connected to a pushrod which is connected to the master vac, and rotatably installed on the second bracket; and
   push-prevention means hingedly coupled to the second bracket for rotating the brake pedal arm in a predetermined direction and comprising a first arm, a second arm, and an insertion projection,
   wherein the insertion projection is fitted in a groove of the brake pedal arm, and the first arm is positioned to face the first bracket such that when an impact force is transmitted from the dash panel, the first arm collides with the first bracket, and the insertion projection is released from the groove.

2. The apparatus of claim 1, wherein the first bracket has a first insertion groove through which a flange bolt to be connected to the second bracket is inserted, and coupling surfaces of the first and second brackets are inclined to a predetermined angle so that, when an impact force is transmitted from the dash panel, as the second bracket is rotated in a preselected direction, the flange bolt can be released from the first insertion groove.

3. The apparatus of claim 1, wherein the push-prevention means comprises:

a first through-hole through which a pipe hinge passes to hingedly couple the push-prevention means to the second bracket; and the first and second arms are formed to extend in different directions when viewed from the first through-hole.

4. The apparatus of claim 3, wherein the insertion projection is formed to extend in a different direction from the first and second arms when viewed from the first through-hole.

5. The apparatus of claim 4, wherein the insertion projection is formed such that it extends from a position of the first through-hole toward the inside of a vehicle and then a distal end portion thereof is bent toward the brake pedal arm.

6. The apparatus of claim 4, wherein the push-prevention means comprises a recess defined adjoining the distal end of one of the first and second arms which extends toward the brake pedal arm to prevent contact between the push-prevention means and the brake pedal arm.

7. The apparatus of claim 4, wherein a portion of the push-prevention means that is brought into contact with the brake pedal arm is rounded in order to smoothly rotate.

8. The apparatus of claim 1, wherein, when the first arm collides with the first bracket due to the impact force transmitted from the dash panel, the push-prevention means is rotated in a direction opposite to a direction in which the first arm collides against the first bracket to transmit the impact force.

9. An apparatus for preventing a brake pedal of a vehicle from being pushed rearward, the apparatus comprising:

a first bracket fastened to a cowl;

a second bracket coupled to the first bracket and a master vac positioned beyond a dash panel;

a brake pedal arm connected to a pushrod which is connected to the master vac, and rotatably installed on the second bracket; and push-prevention means hingedly coupled to the second bracket for rotating the brake pedal arm in a predetermined direction and comprising a first arm, a second arm, and an insertion projection, wherein, the insertion projection is fitted in a groove of the brake pedal arm, and the first arm is positioned to face the first bracket such that when an impact force is transmitted from the dash panel, the first arm collides with the first bracket, and the insertion projection is released from the groove, when the first arm collides with the first bracket due to the impact force transmitted from the dash panel, the push-prevention means is rotated in a direction opposite to a direction in which the first arm collides against the first bracket to transmit the impact force, and when the push-prevention means is rotated, the second arm collides against the brake pedal arm and rotates the brake pedal arm.

* * * * *